(12) United States Patent
Shuman et al.

(10) Patent No.: US 12,111,404 B2
(45) Date of Patent: Oct. 8, 2024

(54) ENHANCED MESSAGING TO HANDLE SPS SPOOFING

(71) Applicant: QUALCOMM Incorporated, San Diego, CA (US)

(72) Inventors: Mohammed Ataur Rahman Shuman, San Diego, CA (US); Dan Vassilovski, Del Mar, CA (US); Jonathan Petit, Wenham, MA (US)

(73) Assignee: QUALCOMM Incorporated, San Diego, CA (US)

( * ) Notice: Subject to any disclaimer, the term of this patent is extended or adjusted under 35 U.S.C. 154(b) by 616 days.

(21) Appl. No.: 17/244,770

(22) Filed: Apr. 29, 2021

(65) Prior Publication Data

US 2022/0353688 A1    Nov. 3, 2022

(51) Int. Cl.
*G01S 19/21* (2010.01)
*H04L 9/40* (2022.01)
*H04W 12/122* (2021.01)
*H04W 4/40* (2018.01)

(52) U.S. Cl.
CPC ........ *G01S 19/215* (2013.01); *H04L 63/1466* (2013.01); *H04W 12/122* (2021.01); *H04W 4/40* (2018.02)

(58) Field of Classification Search
CPC .......... G01S 19/21–215; G01S 17/931; G01S 13/931; G01S 19/48; G01S 5/0072; G01S 19/49; H04W 4/40–48; H04W 12/122; H04L 63/1466
See application file for complete search history.

(56) References Cited

U.S. PATENT DOCUMENTS

| 10,459,089 B2 * | 10/2019 | Van Diggelen ......... G01S 5/015 |
| 2005/0038601 A1 | 2/2005 | Dentinger et al. |
| 2016/0227490 A1 * | 8/2016 | Yang .................. H04W 52/281 |
| 2018/0114441 A1 * | 4/2018 | Marmet ............... H04W 4/027 |

(Continued)

FOREIGN PATENT DOCUMENTS

WO    WO-2017040076 A1    3/2017

OTHER PUBLICATIONS

"SiRF NMEA Reference Manual", SiRF Technology, Inc., Revision 2.1, Dec. 2007 (Year: 2007).*

(Continued)

*Primary Examiner* — Cassi J Galt
(74) *Attorney, Agent, or Firm* — Thien T. Nguyen

(57) ABSTRACT

Techniques are discussed herein for transmission of location information by a user equipment (UE) to other UEs. A UE receives Satellite Positioning System (SPS) signals and determines whether the SPS signals are reliable. The UE determines a location estimate to be transmitted to other UEs using the SPS signals if the SPS signals are determined to be reliable and using non-SPS information if the SPS signals are determined to be not reliable. The location information is transmitted to other UEs in a message that includes an indication of the source of information used to generate the location estimate. A UE that receives the message may determine its location estimate based, at least in part, on the indication of the source of information, e.g., by determining whether SPS signals are reliable based, at least in part, on the indication of the source of information received in the message.

19 Claims, 13 Drawing Sheets

(56) References Cited

U.S. PATENT DOCUMENTS

| | | | |
|---|---|---|---|
| 2020/0020121 A1* | 1/2020 | Rawashdeh | G06V 10/82 |
| 2021/0306979 A1* | 9/2021 | Choi | H04L 5/0051 |
| 2022/0179104 A1* | 6/2022 | Hamada | G01S 19/07 |
| 2022/0232357 A1* | 7/2022 | Zhang | H04W 4/40 |
| 2022/0236425 A1* | 7/2022 | Zangvil | G01S 19/215 |
| 2023/0258815 A1* | 8/2023 | Ghimire | G01S 19/08 |
| | | | 455/456.1 |

OTHER PUBLICATIONS

International Search Report and Written Opinion—PCT/US2022/017646—ISA/EPO—May 27, 2022.

* cited by examiner

ENHANCED MESSAGING TO HANDLE SPS SPOOFING

BACKGROUND

Background Field

The subject matter disclosed herein relates to wireless communications systems, and more particularly to methods and apparatuses for location determination of a user equipment in a wireless communications system and communication when location information may be unreliable.

Relevant Background

Obtaining a reliable, accurate location of one or more mobile devices may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G (Fifth Generation) wireless networks will include support for various positioning methods, which may utilize reference signals transmitted by base stations in a manner similar to which LTE (Long-Term Evolution) wireless networks currently utilize Positioning Reference Signals (PRS) and/or Cell-specific Reference Signals (CRS) for position determination. Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, satellite positioning system signals may be spoofed by overpower or replace the existing SPS signals or other location-related signals causing mobile devices and/or other devices to calculate a wrong location or to obfuscate or jam or otherwise make reliable location determination difficult. It is desirable to ensure that location information that is being communicated between mobile devices, particularly for safety related applications, may be trusted.

SUMMARY

Techniques are discussed herein for transmission of location information by a user equipment (UE) to other UEs. A UE receives Satellite Positioning System (SPS) signals and determines whether the received SPS signals are reliable. The UE determines a location estimate to be transmitted to other UEs using the SPS signals if the received SPS signals are determined to be reliable and using non-SPS information if the received SPS signals are determined to be not reliable. The location information is transmitted to other UEs in a message that includes an indication of the source of information used to generate the location estimate. A UE that receives the message may determine its location estimate based, at least in part, on the indication of the source of information, e.g., by determining whether received SPS signals are reliable based, at least in part, on the indication of the source of information received in the message.

In one implementation, a method performed by a user equipment (UE) for transmitting location information, includes receiving SPS (Satellite Positioning System) signals; determining whether the received SPS signals are reliable; determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; transmitting to one or more UEs, a wireless message that includes the location estimate for the UE and an indication of the source of information used to generate the location estimate.

In one implementation, a user equipment (UE) configured for transmitting location information, includes at least one wireless transceiver configured to wirelessly communicate with entities in a wireless network; an SPS (Satellite Positioning System) receiver configured to receive SPS signals; at least one memory; and at least one processor coupled to the at least one wireless transceiver, the SPS receiver, and the at least one memory, wherein the at least one processor is configured to: receive, via the SPS receiver, SPS signals; determine whether the received SPS signals are reliable; determine a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; transmit, via the at least one wireless transceiver, to one or more UEs, a wireless message that includes the location estimate for the UE and an indication of the source of information used to generate the location estimate.

In one implementation, a user equipment (UE) configured for transmitting location information, the UE includes means for receiving SPS (Satellite Positioning System) signals; means for determining whether the received SPS signals are reliable; means for determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and means for transmitting to one or more UEs, a wireless message that includes the location estimate for the UE and an indication of the source of information used to generate the location estimate.

In one implementation, a non-transitory storage medium including program code stored thereon, the program code is operable to configure at least one processor in a user equipment (UE) for transmitting location information, the program code including instructions to: receive SPS (Satellite Positioning System) signals; determine whether the received SPS signals are reliable; determine a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and transmit to one or more UEs, a wireless message that includes the location estimate for the UE and an indication of the source of information used to generate the location estimate.

In one implementation, a method performed by a first user equipment (UE) for transmission of location information, includes receiving from a second UE a wireless message that includes a location estimate for the second UE and an indication of a source of information used to generate the location estimate, wherein the source of information comprises SPS (Satellite Positioning System) signals or non-SPS information; and determining a location estimate for the first UE at least partially based on the indication of the source of information used to generate the location estimate received from the second UE.

In one implementation, a first user equipment (UE) configured for transmitting location information, includes at least one wireless transceiver configured to wirelessly communicate with entities in a wireless network; an SPS (Satellite Positioning System) receiver configured to receive SPS signals; at least one memory; and at least one processor coupled to the at least one wireless transceiver, the SPS receiver, and the at least one memory, wherein the at least one processor is configured to: receive, via the at least one wireless transceiver, from a second UE a wireless message that includes a location estimate for the second UE and an indication of a source of information used to generate the location estimate, wherein the source of information comprises SPS signals or non-SPS information; and determine a location estimate for the first UE at least partially based on the indication of the source of information used to generate the location estimate received from the second UE.

In one implementation, a first user equipment (UE) configured for transmitting location information, the first UE includes means for receiving from a second UE a wireless message that includes a location estimate for the second UE and an indication of a source of information used to generate the location estimate, wherein the source of information comprises SPS (Satellite Positioning System) signals or non-SPS information; and means for determining a location estimate for the first UE at least partially based on the indication of the source of information used to generate the location estimate received from the second UE.

In one implementation, a non-transitory storage medium including program code stored thereon, the program code is operable to configure at least one processor in a first user equipment (UE) configured for transmitting location information, the program code including instructions to: receive from a second UE a wireless message that includes a location estimate for the second UE and an indication of a source of information used to generate the location estimate, wherein the source of information comprises SPS (Satellite Positioning System) signals or non-SPS information; and determine a location estimate for the first UE at least partially based on the indication of the source of information used to generate the location estimate received from the second UE.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
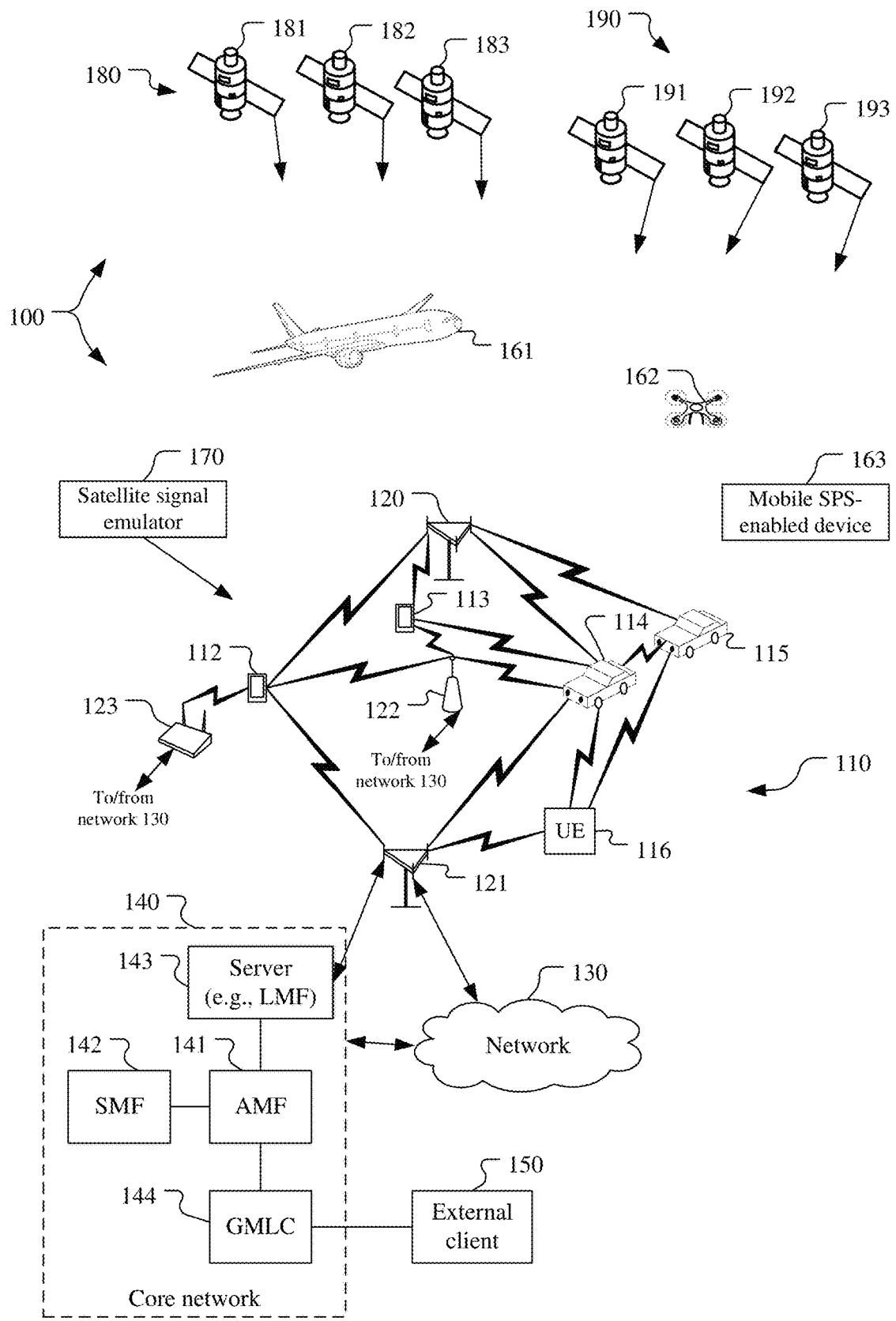
FIG. 1 is a simplified diagram of an example wireless communications and satellite signaling environment.

Inter-device communications may be used for safety application, e.g., where cooperative or automated operation is involved. For example, inter-vehicle communications may be used for automated driving and vehicle safety applications. Inter-vehicle communications may be direct, e.g., vehicle to vehicle, or may be indirect, e.g., via an infrastructure component such as a roadside unit (RSU), access point, or base station. The inter-vehicle communications may include messages and information elements (IEs) with which a vehicle may provide information necessary for automated driving.

For example, for safe operation of autonomous mobile devices, such as vehicles, the relative locations of the devices need to be determined and communicated to other mobile devices. Location information of a device, for example, a user equipment (UE) in a vehicle, sometimes referred to as V-UE, may be transmitted to other V-UEs and/or infrastructure, e.g., RSU, or UEs held by a pedestrian, using direct communication systems, such as dedicated short-range communication (DSRC), cellular Vehicle-to-Everything (C-V2X) communication, and 5G New Radio (NR) communications.

Entities in a wireless communication system may be enabled to continuously transmit and receive messages that include location information. By way of example, C-V2X enabled vehicles continuously transmit and receive Basic Safety Message (BSM) at 10 Hz rate. BSM contains location information for the transmitting vehicle and may further include other information such as speed, heading, and any other information such as indications that the vehicle is braking, malfunctioning, etc. Safety features in vehicles that use such C-V2X messages may depend greatly on the location of the received messages.

Communication systems that depend on communications between entities in the system for safe operation may include well-defined security mechanisms to ensure that the communications are reliable. For example, in the C-V2X ecosystem, each transmitting vehicle signs its transmitted BSM message with a certificate. The security system of a receiving vehicle inspects the signature in a received BSM message to ensure that the message originated from a legitimate vehicle. Additionally, the security system in the receiving vehicle may inspect the time and location in the BSM message to ensured that the BSM message is generated with a relevant time and location and is not a replayed message that has a good certificate but was generated in another location or different time. Current security mechanisms are directed to prevent trust in a message from a rogue vehicle, i.e., a vehicle that is transmitting fraudulent or illegitimate messages.

A possible source of attack in a communication system, such as a C-V2X ecosystem, is causing a vehicle to incorrectly determine its location, e.g., using spoofed satellite positioning system (SPS) signals. The attack using spoofed SPS signals, for example, may use a set of anomalous signals that overpower or replace the existing SPS or other location-related signals to cause the mobile device to calculate a wrong location or to obfuscate or jam or otherwise make reliable location determination difficult. A vehicle, for example, may receive spoofed SPS signals and calculate a wrong location that is transmitted by the vehicle in a BSM message signed with a legitimate certificate.

A receiving vehicle inspecting the signature in the received BSM message will determine it to be a good certificate. Moreover, while the time and location in the BSM message may be wrong, the time and location may be close enough to expected values that the security mechanisms in the receiving vehicle may not detect the BSM message to be a replayed message. Accordingly, the BSM message may be accepted and the location information will be trusted and relied upon by the receiving vehicle, despite the location information, in fact, being wrong. An attack using anomalous signals to cause a wrong location to be transmitted may be utilized to affect traffic, e.g., to clog traffic, cause traffic accidents, or to direct autonomous vehicles to the wrong destination or to foil asset-tracking attempts. In non-vehicle devices, an attack using anomalous signals to cause a wrong location to be transmitted between devices may be utilized to fool location-enabled point-of-sale protection or other security based around transactions that are limited to particular geographical scopes or requiring different degrees of authentication depending on geography.

Alternatively, if the receiving vehicle detects the incorrect location or time in the transmitted message, the receiving vehicle may treat the transmitting vehicle as a "rogue" vehicle and discard messages from the transmitting vehicle. The receiving vehicle may additionally report the transmitting vehicle as a "rogue" vehicle, resulting in the transmitting vehicle losing its certificate, which may inhibit the vehicle's ability to operate.

Thus, it is important that the transmitting vehicle is aware of an SPS spoofing attack (or otherwise anomalous SPS signals) and does not send a location that is determined based on spoofed or otherwise anomalous SPS signals. For example, basic safety applications and advance applications such as cooperative driving depends on the location information of the transmitting vehicle, and transmission of incorrect location information may undermine these applications.

Accordingly, in an implementation, as discussed herein, a UE that receives SPS signals may determine whether those SPS signals are reliable, e.g., whether the SPS signals may be spoofed or otherwise anomalous. The UE may determine a location estimate that is to be transmitted to other UEs using the SPS signals if the received SPS signals are determined to be reliable and using non-SPS information if the received SPS signals are determined to be not reliable. The UE transmits location information to other UEs in a message that includes the location estimate and an indication of the source of information used to generate the location estimate. A UE that receives the message, including the location estimate and the source of the location estimate, from another UE, may determine its own location, at least partially, based on the indication of the source of information. For example, the UE may use the indication of the source of information that is received in the message to assist in determining whether received SPS signals are reliable and may determine its own position estimate using SPS signals if the SPS signals are determined to be reliable or using non-SPS information if the SPS signals are determined to be not reliable.

FIG. 1 illustrates an example wireless communications and satellite signaling environment 100 includes a wireless communication system 110, mobile SPS-enabled devices 161, 162, 163, a satellite signal emulator 170, and satellite constellations 180, 190. The wireless communication system 110 includes a user equipment (UE) 112, a UE 113, a UE 114, a UE 115, a UE 116, base transceiver stations (BTSs) 120, 121, 122, 123, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-116 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.). The communication system 110 may include additional or alternative components. The satellite signal emulator 170 may be configured to provide erroneous, e.g., spoofed, SPS (Satellite Positioning System) signals that appear to be from a satellite, which may lead to erroneous location determination, e.g., by one or more of the devices 161-163 and/or one or more of the UEs 112-116. The devices 161-163 and the UEs 112-116 may be configured to determine when an SPS derived location estimate may be untrustworthy, e.g., based on a determined confidence level generated from non-SPS information, and to provide transmit messages to other devices (devices 161-163 and UEs 112-116) with its location information including a location estimate (determined using SPS signals or non-SPS information), a confidence level in the location estimate, and the source of information used to generate the location estimate.

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-116) may be configured to determine locations of the UEs 112-116. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or a TRP (Transmission/Reception Point), or may be disposed remote from the gNB and/or TRP and configured to communicate directly or indirectly with the gNB and/or the TRP.

The AMF 141 may serve as a control node that processes signaling between the UEs 112-116 and the core network 140 and provides QoS (Quality of Service) flow and session management. The AMF 141 may support mobility of the UEs 112-116 including cell change and handover and may participate in supporting signaling connection to the UEs 112-116.

The system 110 is capable of wireless communication in that components of the system 110 can communicate with one another (at least sometimes using wireless connections) directly or indirectly, e.g., via the BTSs 120-123 and/or the network 130 (and/or one or more other devices not shown, such as one or more other base transceiver stations). For indirect communications, the communications may be altered during transmission from one entity to another, e.g., to alter header information of data packets, to change format, etc. The UEs 112-116 shown are a smart device, such as a smartphone or smartwatch, a tablet computer, and a vehicle-based device, but these are examples only as the UEs 112-116 are not required to be any of these configurations, and other configurations of UEs may be used. A smart device, for example, may be any electronic device that is can be generally connected to other devices or networks via different wireless protocols such as Bluetooth, Zigbee, NFC, Wi-Fi, LiFi, 5G, etc., that can operate to some extent interactively and autonomously. The UEs 112, 113 shown are mobile wireless communication devices (although they may communicate wirelessly and via wired connections) including mobile phones (including smartphones) and a tablet computer. The UEs 114 and 115 shown are a vehicle-based mobile wireless communication device (although the UE 114 may communicate wirelessly and via wired connections). The UE 116 is shown as a generic UE and may be one or more types of UEs, whether mobile or not, whether of a type shown or not. For example, the UE 116 may include one or more UEs that are, or may be associated with an entity that is, a typically-static or static device such as a roadside unit (RSU), cash register, an automatic teller machine (ATM), a restaurant or other building, etc. Other types of UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-116, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system), e.g., to allow the external client 150 to request and/or receive location information regarding the UEs 112-116 (e.g., via the GMLC 144).

The UEs 112-116 or other devices may be configured to communicate in various networks and/or for various purposes and/or using various technologies (e.g., 5G, Wi-Fi communication, multiple frequencies of Wi-Fi communication), satellite positioning, one or more types of communications (e.g., GSM (Global System for Mobiles), CDMA (Code Division Multiple Access), LTE (Long-Term Evolution), V2X (Vehicle-to-everything e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The communication links shown in FIG. 1 are examples and not limiting of the disclosure. The UEs 112-116 may communicate with base stations, with other UEs, etc.

The BTSs 120-123 may wirelessly communicate with the UEs 112-116 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-116 via multiple carriers. Each of the BTSs 120, 121 may provide communication coverage for a respective geographic region, e.g. a cell. Each cell may be partitioned into multiple sectors as a function of the base station antennas. A BTS may be any of a variety of forms such as a desktop device, a roadside unit (RSU), etc.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-116 may be referred to as terminals, access terminals (ATs), mobile stations, mobile devices, subscriber units, etc. The UEs 112-116 may include various devices as listed above and/or other devices. The UEs 112-116 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-116 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-116 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

The UEs 112-116, such as V-UEs 114 and 115, may use the V2X communication standard, in which information is passed between a vehicle and other entities within the wireless communication network, such RSU 116. The V2X standard aims to develop autonomous or semi-autonomous driving systems, such as Advanced Driver Assistance System (ADAS), which helps drivers with decisions, such as lane changes, speed changes, overtaking speeds, and may be used to assist in parking as discussed herein. The UEs 112-116 may communicate directly, e.g., peer-to-peer messaging, or via one or more intermediate entities, such as via RSU 116 or BTSs 120-123 or network 130 in an infrastructure-based messaging.

In general, there are two modes of operation for V2X services, as defined in Third Generation Partnership Project (3GPP) TS 23.285. One mode of operation uses direct wireless communications between V2X entities when the V2X entities, which may sometimes be referred to as sidelink communication. The other mode of operation uses network based wireless communication between entities. The two modes of operation may be combined, or other modes of operation may be used if desired.

Entities using V2X communications, such as UEs 114 and 115 may operate using direct or indirect wireless communications. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities.

Thus, as illustrated, UEs 114 and 115 may directly communicate using with a Vehicle-to-Vehicle (V2V) communication link. UEs 114 and 115 may similarly directly communicate with a roadside unit (RSU), e.g., UE 116, via Vehicle-to-Infrastructure (V2I) communication links. The RSU 116, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The UEs 114, 115, and 116 may communicate with additional entities, such as additional vehicles, RSUs or with a UE 113, e.g., held by pedestrian using direct communication links.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UEs 114 and 115 may indirectly communicate with each other, e.g., through the RSU 116 via the V2I communication links, respectively or through other network infrastructure such as BTSs 120-123 and network 130, e.g., using cellular vehicle-to-everything (C-V2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

The mobile SPS-enabled devices 161-163 are configured with SPS capabilities (e.g., to determine location based on received SPS signals). One or more of the SPS-enabled devices 161-163 may be configured with other capabilities, e.g., communication capabilities, similar to those of the UEs 112-116. The device 161 is an airplane and the device 162 is an unoccupied aerial vehicle (UAV), but these are examples only and not limiting of the disclosure. The mobile SPS-enabled device 163 is shown as a generic SPS-enabled device. The device 163 may be one or more mobile SPS-enabled devices such as one or more land-based items (e.g., a train, a truck, a tank, etc.), one or more water-based items (e.g., a ship, a jet-ski, etc.), and/or one or more air-based items (e.g., a missile, a space ship, etc.), etc. These examples are non-limiting of the disclosure and other SPS-enabled devices may be used.

The communication system 110 may utilize information from a constellation 180 of satellite vehicles (SVs) 181, 182, 183 and/or a constellation 190 of SVs 191, 192, 193. Each of the constellations 180, 190 may correspond to a respective Global Navigation Satellite System (GNSS) (i.e., Satellite Positioning System (SPS)) such as the Global Positioning System (GPS), the GLObal NAvigation Satellite System (GLONASS), Galileo, Beidou, or some other local or regional SPS such as the Indian Regional Navigational Satellite System (IRNSS), the European Geostationary Navigation Overlay Service (EGNOS), or the Wide Area Augmentation System (WAAS). Only three SVs are shown for each of the constellations 180, 190, but constellations of GNSS SVs will include more than three SVs.

Knowing the location of a UE is important for many applications and/or in many circumstances. Moreover, knowing the locations of other nearby UEs may be important in many applications, such as in vehicle operation. UEs may transmit messages to other nearby UEs, such as CAM, and DENM, and BSM messages that may be used for ADAS or other safety use cases. These messages, for example, include the current location of the transmitting UE, which may be derived using SPS signals. For example, current V2X standards, such as SAE (Society for Automotive Engineering) specifications J2945, J3161, J3224, J3186 etc., facilitate sharing location information with other UEs, and including the accuracy of the location information. The accuracy of the location information, for example, is an uncertainty in a measurement location. If the transmitting UE, however, determines an incorrect location based on anomalous SPS signals, the UE may believe the measured location has high accuracy, e.g., low uncertainty, but the location measurement may, in fact, be incorrect. If the transmitting UE transmits the incorrect location to other UEs, there may be significant consequences, including traffic incidents, and may undermine the trust and safety in the ability of the UEs to operate. Current standards for sharing location information are limited as they do not enable communication of the source of the location information being provided. For example, if a transmitting UE determines that it is under an SPS spoofing attack or otherwise cannot rely on received SPS signals, the transmitting UE may switch to estimate its position based on non-SPS information, such as cached locations, sensor information, and locations of other C-V2X vehicles. Current standards for sharing location information, however, would merely enable the transmitting UE to send the non-SPS based location determination (with accuracy), but does not allow for the transmitting UE to indicate that the source of the location information being provided, e.g., that the location information is based on non-SPS based information, or more specifically the type of non-SPS based information. Moreover, the current standards do not permit communication indicating that a transmitting UE may be under an SPS spoofing attack or is otherwise receiving anomalous and unreliable SPS signals.

An incorrect location may be determined based on erroneous input information such as an incorrect SPS signal, whether the inaccuracy of the SPS signal is unintentional (e.g., due to SV error) or intentional (e.g., due to an entity providing one or more spoofed signals). A spoofed signal is a signal that appears to be from a particular source (e.g., a known, trusted source) but is from a different source. For example, a spoofed signal may have characteristics of a signal from a GPS SV but originate from a GLONASS SV or an SPS simulator (e.g., a terrestrial-based SPS signal generator). Identifying SPS based location estimates that are untrustworthy, e.g., due to anomalous SPS signals, and providing location information to other UEs that includes a location estimate that is trustworthy, along with the confidence level in the location estimate and the source of the location estimate may help a UE mitigate the consequences of receiving such signals, and to enable continued safe operation of the UEs.

For example, in one implementation, a UE, such as a V-UE, may check its location information that is determined based on SPS with non-SPS information, such as cache location information and location information derived from other (non-SPS) sensors. Checking the location information will enable the UE to determine a confidence level in the trustworthiness of the location estimate. It should be understood that the confidence level is an indication of statistical probability that the estimated location is accurate, i.e., it is based on non-anomalous SPS signals, as opposed to an uncertainty in the estimated location. The UE may additionally determine an approximate location estimate using non-SPS based location information, such as a reliable earlier known location and information from non-SPS sensors. The UE further use location information received from other UEs to assist in determining the approximate location. In some implementations, the UE may determine the confidence level in the SPS derived location estimate by comparing the SPS derived location estimate to the approximate location estimate determined using non-SPS based location information. In other implementations, the UE may determine the approximate location estimate using non-SPS based location information only if the confidence level in the SPS based location estimate is low.

As discussed herein, if the UE determines that the SPS based location estimate may be compromised (e.g., the confidence level is less than a predetermined threshold), the UE may transmit the non-SPS based location estimate along with an indication of how the location estimate was derived to other UEs. The UE may further transmit a confidence level in the non-SPS based location estimate and may additionally provide an indication that the UE is receiving spoofed SPS signals. With all UEs transmitting the estimated locations, with an indication of how the estimated location was determined and the confidence level in the estimated location, each UE will know the "confidence level" of the location information of all other UEs that it is receiving.

Practically, an SPS spoofing target may be a group of vehicles in a specific location or a single or group of targeted vehicles. A vehicle under a SPS spoofing attack may receive "good" SPS based locations from other vehicles that are receiving valid SPS signals, e.g., SPS signals that are not spoofed. A vehicle may then use the accurate location information from other vehicles to help estimate its own position. Additionally, vehicles will be able to draw a moving map of the vehicles that are under an SPS spoofing attack or an area in which SPS signals are not reliable. Vehicles may send this information to a traffic management server to warn about the possible spoofing of specific vehicles or areas. The traffic management server may provide a warning to vehicles that SPS signals are unreliable, e.g., in specific identified areas, which may also be used by UEs when determining a confidence level in SPS derived location estimate.

Figure 2:
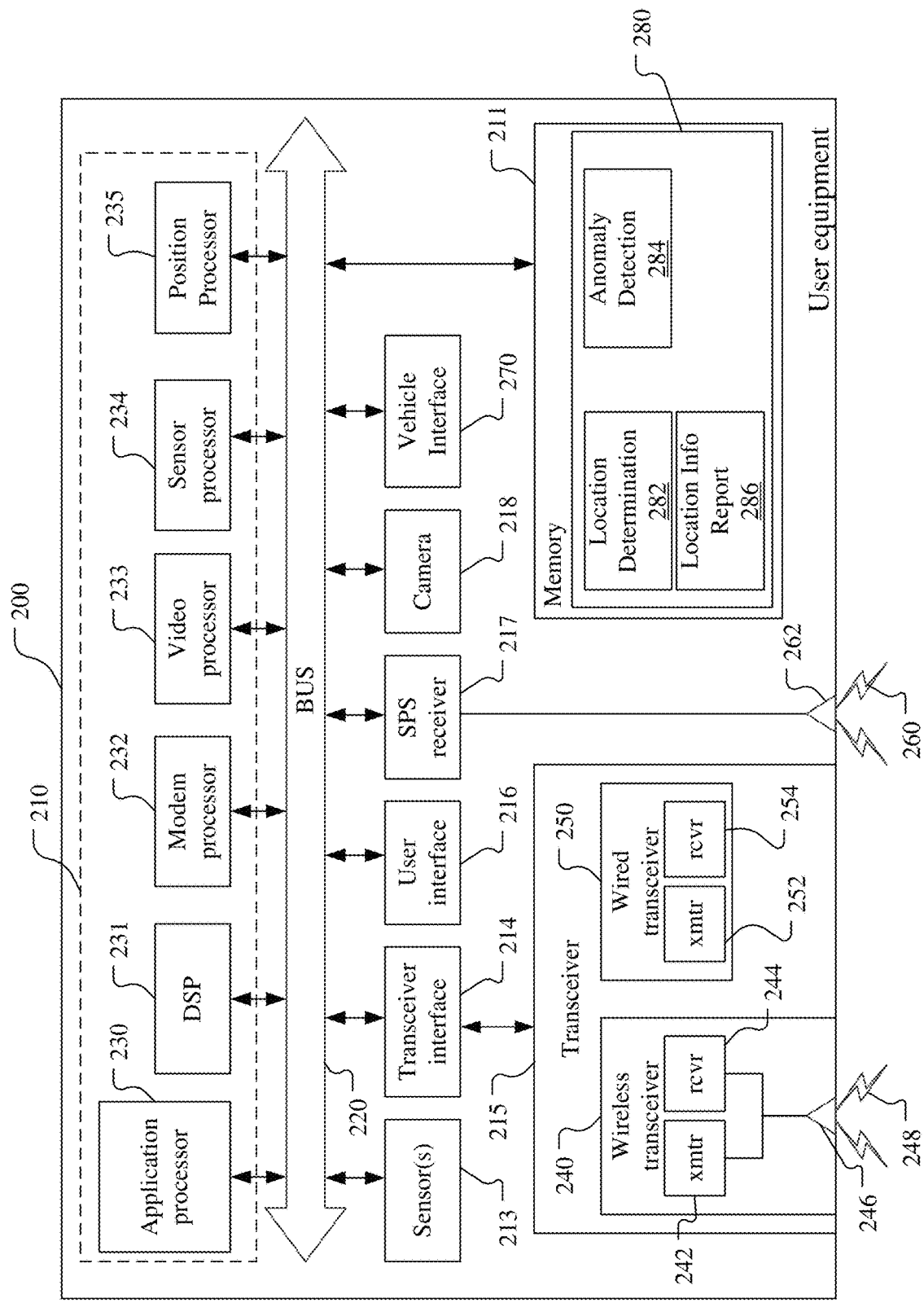
FIG. 2 is a block diagram of components of an example user equipment shown in FIG. 1.

FIG. 2 illustrates a UE 200, which may be an example of any of the UEs 112-116 and comprises a computing platform including at least one processor 210, memory 211 including software (SW) 280, one or more sensors 213, a transceiver interface 214 for a transceiver 215, a user interface 216, a Satellite Positioning System (SPS) receiver 217, a camera 218. If the UE 200 is a V-UE, it may include a vehicle interface 270. The processor 210, the memory 211, the sensor(s) 213, the transceiver interface 214, the user interface 216, the SPS receiver 217, the camera 218, and the vehicle interface 270 may be communicatively coupled to each other by a bus 220 (which may be configured, e.g., for optical and/or electrical communication). One or more of the shown apparatus (e.g., the camera 218, vehicle interface 270 and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, which may be configured to operate as a special purpose processor as discussed herein, a Digital Signal Processor (DSP) 231, a modem processor 232, a video processor 233, a sensor processor 234 and/or a position processor 235 (which may sometimes be referred to as a position engine 235). One or more of the processors 230-235 may comprise multiple devices (e.g., multiple processors). For example, the sensor processor 234 may comprise, e.g., processors for radar, sonar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 280 which may be processor-readable, processor-executable software code containing instructions that are configured to, when executed, cause the processor 210 to operate as a special purpose computer programmed to perform the various functions described herein. Alternatively, the software 280 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-235 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the aspects of the disclosure, including the claims, and other configurations may be used. For example, an example configuration of the UE includes one or more of the processors 230-235 of the processor 210, the memory 211, and the wireless transceiver 240. Other example configurations include one or more of the processors 230-235 of the processor 210, the memory 211, the wireless transceiver 240, and one or more of the sensor(s) 213, the user interface 216, the SPS receiver 217, the camera 218, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes. The sensor(s) 213 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may include RADAR (Radio Detection and Ranging) sensors, LIDAR (Light Detection and Ranging) sensors, SONAR (Sound Navigation and Ranging), ultrasound ranging, etc., for determining ranges to objects. The sensor(s) 213 may further include a local oscillator for tracking time. The sensor(s) 213 may include one or more vision systems (e.g., including the camera 218), and/or one or more device sensor such as one or more vehicle sensors (e.g., an odometer, a speedometer, a tachometer, a wheel revolution counter, etc.), and/or one or more other sensors. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 143 regarding the mobility of the UE 200. For example, based on the information obtained/measured by the sensor(s), the UE 200 may notify/report to the server 143 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices such as other UEs) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee, etc. The wireless transceiver 240 may be configured to communicate signals in one or more of various types of networks including WWAN (Wireless Wide Area Network), WLAN (Wireless Local Area Network), etc. New Radio may use mmwave frequencies and/or sub-6 GHz frequencies. The wired transceiver 250 may include a transmitter 252 and a receiver 254 configured for wired communication, e.g., with the network 130 to send communications to, and receive communications from, the UE 200, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by multi-lateration using the SPS signals 260. The SPS signals 260 may be from one or more SPS constellations, e.g., the constellations 180, 190 and the SPS receiver 217 may be configured as a multi-SPS (multi-GNSS) to process SPS signals from multiple SPSs. The SPS signals 260 may include signals of a variety of SPS frequency bands and the SPS receiver 217 may be configured as a multi-band SPS receiver to receive and process SPS signals of multiple bands. The at least one processor 230, the memory 211, the DSP 231 and/or one or more additional specialized processors (not shown) may be utilized to process acquired SPS signals, in whole or in part, and/or to calculate an estimated location of the UE 200, in conjunction with the SPS receiver 217. Any processor of the SPS receiver 217 for processing of signals received by the SPS receiver 217 may be considered to be part of the processor 210, and thus the description herein may refer to a processor of a UE (e.g., the processor 210 of the UE 200) as processing one or more SPS signals (e.g., determining one or more measurements of one or more SPS signals). The memory 211 may store indications (e.g., measurements) of the SPS signals 260 and/or other signals (e.g., signals acquired from the wireless transceiver 240) for use in performing positioning operations. The general-purpose processor 230 configured to operate as a special purpose computer, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position engine 235 may be configured to determine a position of the UE 200, motion of the UE 200, and/or relative position of the UE 200, and/or time. For example, the position engine 235 may communicate with, and/or include some or all of, the SPS receiver 217. The position engine 235 may work in conjunction with one or more other processors in the processor 210 and the memory 211 as appropriate to perform at least a portion of one or more positioning methods, although the description herein may refer only to the position engine 235 being configured to perform, or performing, in accordance with the positioning method(s). Moreover, the position engine 235 may be part of or integrated with any processor in processor 210, such as application processor 230. The position engine 235 may also or alternatively be configured to determine location of the UE 200 using non-SPS information such as terrestrial-based signals (e.g., at least some of the signals 248, such as received cellular signals or LAN signals, such as WiFi, or other short wave signals, such as ultrawideband (UWB), mmWave, etc.) for multi-lateration, for assistance with obtaining and using the SPS signals 260, or both. The position engine 235 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The position engine 235 may be further configured to determine the position of the UE 200 using non-SPS information, such as previous (cached) location information, sensor information obtained from one or more of the sensors 213 (e.g., gyroscope(s), accelerometer(s), magnetometer(s), etc.) that may sense orientation and/or motion of the UE 200 and provide indications thereof that the processor 210 (e.g., the position engine 235 or the processor 230 and/or the DSP 231) may be configured to use to determine motion (e.g., a velocity vector and/or an acceleration vector) of the UE 200. The position engine 235 may further use location information received from one or more UEs, such as the estimated location of the other UEs, as well as determined ranges to the UEs to determine a position of the UE. The position engine 235 may be configured to provide indications of uncertainty and/or error in the determined position and/or motion.

The vehicle interface 270 may be used by the UE 200 to provide an interface with and control over the automated driving of a vehicle in which the UE 200 may be located. The vehicle interface 270, for example, may provide commands for the automated driving of the vehicle, such as control over acceleration, deceleration, speed, trajectory, etc.

The memory 211 may store software 280 that contains executable program code or software instructions that when executed by the processor 210 may cause the processor 210 to operate as a special purpose computer programmed to perform the functions disclosed herein. The description herein may refer to the UE 200 performing a function as shorthand for one or more appropriate components (e.g., the processor 210 configured by executable program code stored in the memory 211) of the UE 200 performing the function. As illustrated, the memory 211 may include one or more components or modules that may be implemented by the processor 210 to perform the disclosed functions. While the components or modules are illustrated as software 280 in memory 211 that is executable by the processor 210, it should be understood that the components or modules may be stored in another computer readable medium or may be dedicated hardware either in the processor 210 or off the processor. A number of software modules and data tables may reside in the memory 211 and be utilized by the processor 210 in order to manage both communications and the functionality described herein. It should be appreciated that the organization of the contents of the memory 211 as shown is merely exemplary, and as such the functionality of the modules and/or data structures may be combined, separated, and/or be structured in different ways depending upon the implementation.

The memory 211, for example, may include a location determination module 282 that when implemented by the one or more processors 210 configures the one or more processors 210, e.g., processor 230 or position engine 235, to determine a location of the UE 200 in one or more ways. The one or more processors 210, for example, may be configured to determine a location estimate of the UE 200 based on SPS signals received by the SPS receiver 217, which may include anomalous signals that will produce an incorrect location estimate. The one or more processors 210 may be further configured to determine an estimated location of the UE 200 based on non-SPS information, such as previous estimated locations (i.e., cached location information stored in memory 211), sensor information obtained from sensors 213, and location information received from other nearby UEs, e.g., via transceiver 240, or a combination thereof. The one or more processors 210, for example, may be configured to determine a location estimate using cellular signals and/or wireless local area network signals, e.g., from base transceiver stations (BTSs) 120, 121, 122, 123 or from other UEs in sidelink signaling, e.g., using time difference of arrival (TDOA), angle of arrival (AoA), received signal strength (RSS), or other known measurements. The one or more processors 210, for example, may be configured to determine a time-filtered location of the UE 200 by using a filter, e.g., a Kalman filter, to calculate location using measurements over time. The one or more processors 210 may be configured, for example, for dead reckoning from a previous estimated location using sensor information received from sensors 213. The one or more processors 210 may be configured to use sidelink positioning, e.g., using locations received from a number of different entities, e.g., UEs, along with ranging to the entities (e.g., from radar, lidar, sonar or wireless ranging techniques, such as round trip time measurements) to determine an estimated location, e.g., using multilateration techniques. The one or more processors 210 may be configured to use multiple different techniques and sources of data to determine a location estimate, e.g., using different weights based on confidence levels for various sources of data or techniques. For example, the one or more processors 210 may be configured to may adjust a weighting of (e.g., apply a weighting factor between 0 and 1) to various sources of data or may adjust the weight positioning techniques (e.g., dead reckoning vs RTT/multilateration) used in determining the location of the UE 200 based on confidence levels in the source of data. The one or more processors 210 may be further configured to determine a confidence level in the non-SPS derived location estimate, e.g., based on the types of data used to determine the location estimate, as well as confidence levels associated with the data used.

The memory 211, for example, may include an anomaly detection module 284 that when implemented by the one or more processors 210 configures the one or more processors 210 to determine whether SPS signals received are reliable or anomalous, e.g., spoofed, and producing unreliable location estimate. The one or more processors 210, for example, may be configured to determine a confidence level in an SPS derived location estimate. The confidence level, for example, may be determined by comparing the time derived from the SPS signals to a local time, e.g., determined from a local oscillator in sensors 213 or from wireless signals received from BTSs via transceiver 240, e.g., where closely matching times provides a greater confidence level than mis-matched times. The one or more processors 210 may be additionally or alternatively configured to determine a confidence level based on the SPS derived location estimate and non-SPS information, such as previous estimated locations (i.e., cached location information stored in memory 211), sensor information obtained from sensors 213, and location information received from other nearby UEs, e.g., via transceiver 240, or a combination thereof. For example, the one or more processors 210 may be configured to determine the degree to which the SPS derived location estimate is aligned with cached location estimates and/or locations received from nearby UEs. The one or more processors 210 may be configured to determine whether changes in the location of the UE 200 as indicated by the SPS derived location estimate with respect to a previous location estimate corresponds to data obtained from sensors 213, e.g. acceleration, velocity, orientation. The one or more processors 210 may be configured to determine a difference between the SPS derived location estimate and a non-SPS derived location estimate, e.g., generated using non-SPS information, where closely matching locations provides a greater confidence level than mis-matched locations. In generating the confidence level, the one or more processors 210 may be configured to provide different weights for different kinds of disparities, e.g., noisy sensors may be given less weight than sensors with little noise. Additionally, the one or more processors 210 may be configured to compare the confidence level to a predetermined threshold, e.g., to determine if the SPS based location estimate is reliable (if the confidence level is greater than the threshold) or unreliable (if the confidence level is less than the threshold). The one or more processors 210 may be configured to determine the reliability of the SPS signals and, accordingly, a position estimate based on the SPS signals or non-SPS information, at least partially based on information received from other UEs or a traffic location server, such as whether the source of location information for other UEs is non-SPS information, the confidence levels of the estimated locations from other UEs or a warning that anomalous SPS signals have been detected by nearby UEs. The one or more processors 210, for example, may be configured to determine whether SPS signals are reliable based on location information messages received from one or more V-UEs. For example, the one or more processors 210 may be configured to determine if SPS signals are reliable based on a number of V-UEs using non-SPS information for location estimates, associating a low confidence level with SPS based location estimates, providing an indication that SPS signals received by the V-UE were determined to be anomalous, etc. In an implementation, where the UE 200 is an RSU, the one or more processors 210 may be configured to determine if SPS signals are reliable for the V-UEs, e.g., based on location estimates provided by the V-UEs, and in some implementations, based on additional information, such as determined ranges between V-UEs.

The memory 211, for example, may include a location information report module 286 that when implemented by the one or more processors 210 configures the one or more processors 210 to produce and transmit a message that includes location information for the UE 200 or to receive location information for other UEs, via transceiver 240. The location information includes a determined location estimate and the source of the location estimate. For example, the location estimate may be an SPS derived location estimate if there is high confidence in the SPS derived location estimate, i.e., the received SPS signals are not determined to be anomalous, or may be a non-SPS derived location estimate if there is low confidence in the SPS derived location estimate. The source of the location estimate may be an identification of the source of data, e.g., SPS signals or non-SPS data. In some implementations, the source of data may be further refined to the SPS constellation, carrier frequency, etc., or the type of sensor data or techniques used to generate the non-SPS based location estimate, such as SPS signals, cellular signals, LAN signals, sidelink signals, TDOA measurements, AoA measurements, and RSS measurements, etc. The transmitted location information that is transmitted or received may further include the determined confidence level associated with the location estimate in the location information message. The one or more processors 210 may additionally be configured to receive similar location information from one or more other UEs, via the transceiver 240. The messages may be V2X type messages or other direct or indirect messages to other nearby UEs. The messages may be, e.g., CAM, DENM, or BSM messages, e.g., used for safety applications, such as ADAS. In some implementations, other types of messaging between UEs may be used, e.g., if the UE 200 is a non-vehicle related UE. The one or more processors 210 may additionally be configured to transmit, via the transceiver 240, to a traffic location server or other UEs an indication when received SPS signals have been determined to be anomalous, e.g., along with location information, such as a determined location estimate and optionally, the source of the location estimate and/or confidence level. The one or more processors 210 may additionally be configured to receive, via the transceiver 240, a warning from a traffic location server or other UEs with an indication when SPS signals in the area of the UE 200 have been determined to be anomalous by other UEs.

The methodologies described herein may be implemented by various means depending upon the application. For example, these methodologies may be implemented in hardware, firmware, software, or any combination thereof. For a hardware implementation, the one or more processors 210 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium such as memory 211 that is connected to and executed by the one or more processors 210. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code on a non-transitory computer readable medium, such memory 211. Examples include computer readable media encoded with a data structure and computer readable media encoded with a computer program. For example, the non-transitory computer readable medium including program code stored thereon may include program code to determination of anomalous SPS signals and transmission of location information along with the source of the location information, in a manner consistent with disclosed embodiments. Non-transitory computer readable medium includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium such as memory 211, instructions and/or data may be provided as signals on transmission media included in a communication apparatus. For example, a communication apparatus may include a transceiver 240 or 250 having signals indicative of instructions and data. The instructions and data are configured to cause one or more processors to implement the functions outlined in the claims. That is, the communication apparatus includes transmission media with signals indicative of information to perform disclosed functions.

Memory 211 may represent any data storage mechanism. Memory 211 may include, for example, a primary memory and/or a secondary memory. Primary memory may include, for example, a random access memory, read only memory, etc. While illustrated in this example as being separate from one or more processors 210, it should be understood that all or part of a primary memory may be provided within or otherwise co-located/coupled with the one or more processors 210. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium. As such, in certain example implementations, the methods and/or apparatuses presented herein may take the form in whole or part of a computer readable medium that may include computer implementable code stored thereon, which if executed by one or more processors 210 may be operatively enabled to perform all or portions of the example operations as described herein. Computer readable medium may be a part of memory 211.

Figure 3:
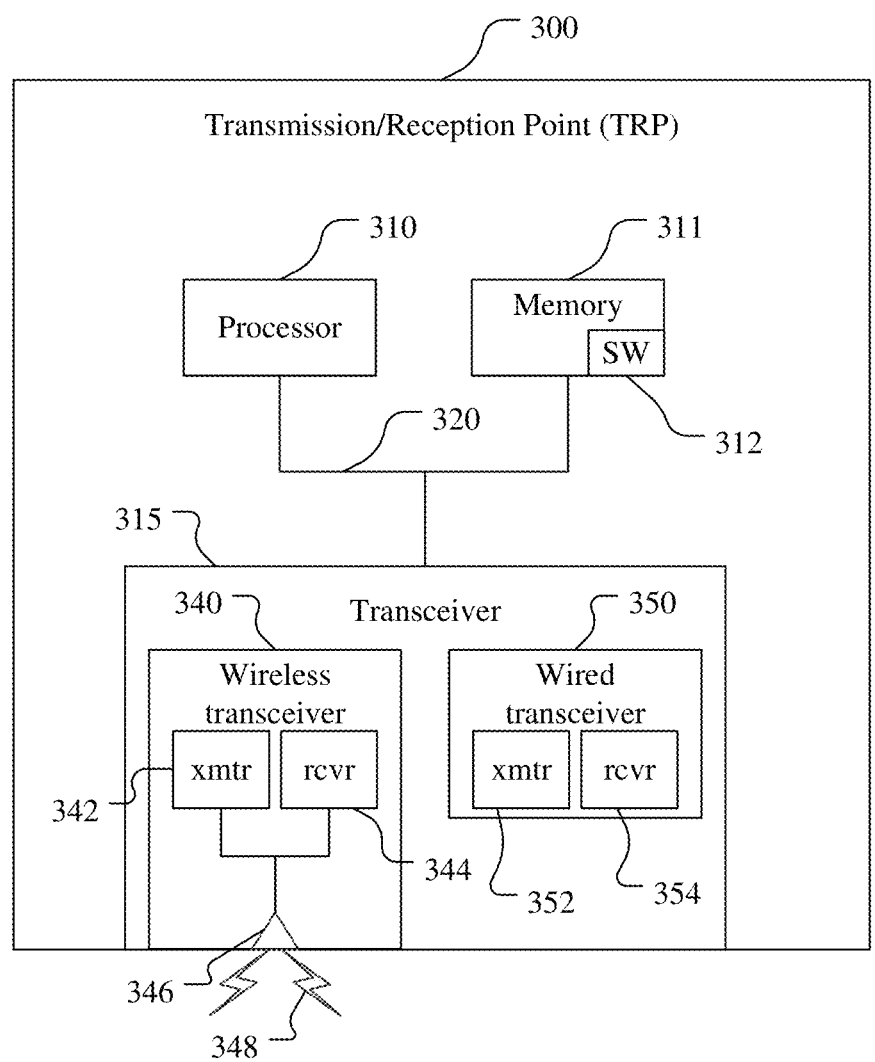
FIG. 3 is a block diagram of components of an example transmission/reception point shown in FIG. 1.

FIG. 3 illustrates an example of a TRP 300 of the BTSs 120-123 that comprises a computing platform including at least one processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including one or more of an application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to operate as a special purpose computer programmed to perform various functions described herein. Alternatively, the software 312 may not be directly executable by the processor 310 but may be configured to cause the processor 310, e.g., when compiled and executed, to operate as a special purpose computer programmed to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 130 to send communications to, and receive communications from, the server 143, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the aspects of the disclosure, including the claims, and other configurations may be used. For example, the description herein discusses that the TRP 300 is configured to perform or performs several functions, but one or more of these functions may be performed by the server 143 and/or the UE 200 (i.e., the server 143 and/or the UE 200 may be configured to perform one or more of these functions).

Figure 4:
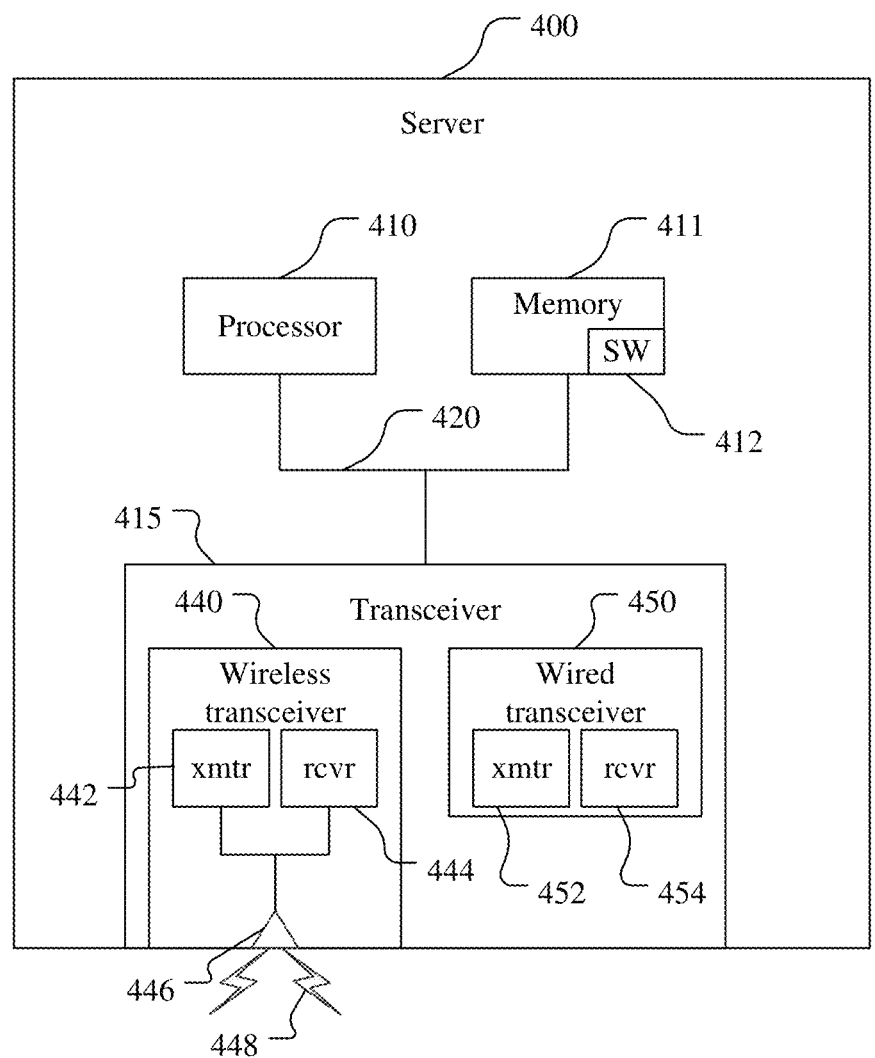
FIG. 4 is a block diagram of components of an example server shown in FIG. 1.

FIG. 4 illustrates a server 400, which is an example of the server 143, that comprises a computing platform including at least one processor 410, memory 411 including software (SW) 412, and a transceiver 415. The server 400, for example, may be a traffic control server, configured to receive indications from UEs when SPS signals are determined to be anomalous, and to provide warnings to UEs in areas where anomalous SPS signals have been detected. The processor 410, the memory 411, and the transceiver 415 may be communicatively coupled to each other by a bus 420

(which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including at least one of an application processor, a DSP, a modem processor, a video processor, and/or a sensor processor similar to that shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to operate as a special purpose computer programmed to perform various functions described herein. Alternatively, the software 412 may not be directly executable by the processor 410 but may be configured to cause the processor 410, e.g., when compiled and executed, to operate as a special purpose computer programmed to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 130 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the aspects of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
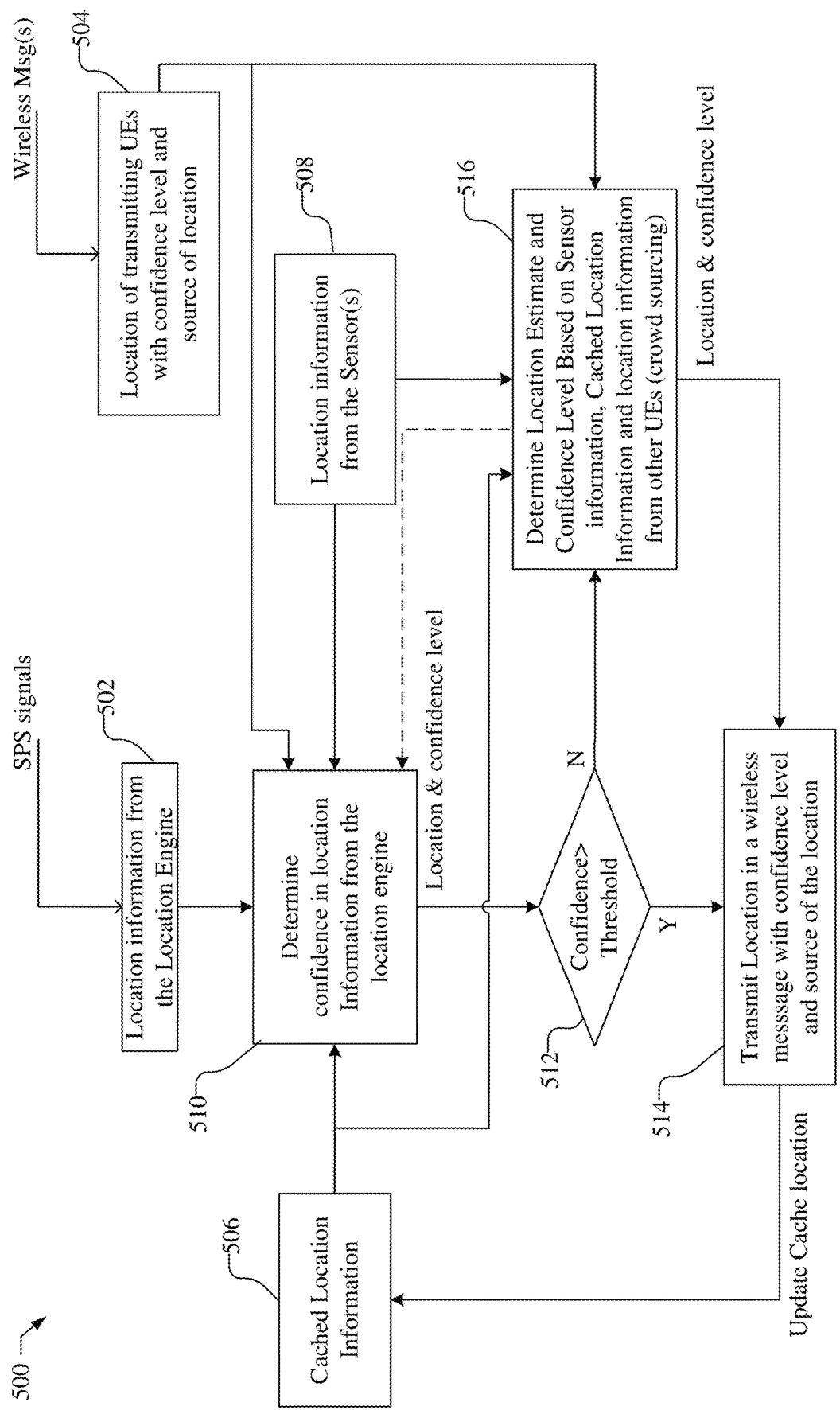
FIG. 5 is a flow chart illustrating determination in the confidence level of an SPS derived location estimate and selection of location estimate to transmit to other UEs.

FIG. 5 illustrates a flow chart 500 for a UE, such as UE 200, to determine a confidence level in its location information and use that to warn nearby UEs when there is an SPS spoofing attack and to correct its location information that is provided to nearby UEs.

As illustrated, the UE receives SPS signals, which is used to generate location information from position engine 235 in FIG. 2, at block 502. The SPS signals may be non-anomalous and thus, the resulting location information at block 502 may include a correct location estimate. Alternatively, the SPS signals may be anomalous, e.g., spoofed, and the resulting location information at block 502 may include an incorrect location estimate.

The UE further receives wireless messages from one or more other UEs, e.g., via transceiver 240 shown in FIG. 2, from which the location of the transmitting UEs may be determined at block 504. The wireless messages may further include the confidence level in the location of the transmitting UEs and the source of the location estimate, as indicated in block 504. The wireless messages, by way of example, may be Common Awareness Messages (CAM), Decentralized Notification Messages (DENM) or Basic Safety Message (BSM), used for, e.g., Advanced Driver Assistance System (ADAS), provided via C-V2X or other types of communications.

As illustrated at block 506, the UE may maintain a cache of its own location information. The cached location information, for example, may be the last known location, which may be used, e.g., in case of a power down. The cached location information may include a previously determined location estimate, which may be derived from SPS information (if reliable) or non-SPS information, such as from information from non-SPS sensors, and previously cached location information and location information received from other UEs. The cached location information may further include additional information, such a confidence level in the location estimate, an indication of the source of the location estimate, or a combination thereof.

At block 508, the UE may derive location information from non-SPS sensors, such as sensors 213, camera 218, and wireless transceiver 240 in FIG. 2. For example, the location information may include IMU data, indicating acceleration, orientation, wheel revolution counts, RADAR data, LIDAR data, image information, etc. The location information may further include location information received from other UEs or an indication that received SPS signals may be unreliable, e.g., which may be received from other UEs or from a traffic management server, via wireless transceiver 240 in FIG. 2.

At block 510, the UE determines the confidence level in the location information determined using the SPS signals at block 502. The UE, for example, may determine whether the received SPS signals are anomalous, and thus, the confidence level in the location information determined using the SPS signals is correspondingly low. In some implementations, the UE may compare changes in the position and time determined using the SPS signals with information derived from non-SPS information, including the cached location information, sensor information, and location information received from other UEs. For example, spoofed SPS signals may carry a time that is different from the actual SPS time. When spoofing occurs, the difference between the local time, e.g., derived from a local oscillator of the sensors 213 in FIG. 3 and SPS time received in the SPS signals may experience a sudden change that is not normally occurring, and observation of this change may indicate anomalous SPS signals and low confidence in the SPS derived location estimate.

Additionally, anomalous SPS signals may generate an incorrect location estimate. Thus, anomalous SPS signals may be detected by determining that the location estimate derived from the received SPS signals is incorrect, e.g., based on non-SPS information. For example, a sudden change in location will necessarily require corresponding signals from the non-SPS sensors in the UE, such as a rapid acceleration to accommodate the sudden change in location, RADAR and LIDAR should observe a rapid change of the surrounding environments, RADAR will have to detect sudden rise in the doppler signals, steering column sensor will have to register change in yaw, while wheels sensors will have to register changes in the vehicle velocity. In the absence of corresponding indications of an abrupt location change from the non-SPS sensors, a sudden change in an SPS derived location estimate may indicate that the SPS signals are anomalous and suspicious, and necessary remedial steps may be required.

Thus, the SPS derived location estimate may be compared to non-SPS information, e.g., from non-SPS sensors, cached location, and locations received from one or more other UEs. In some implementations, the non-SPS based information that is compared to the SPS derived location estimate may be another location estimate derived from non-SPS sources, such as non-SPS sensors, cached location, and locations of other UEs, e.g., as determined at block 516. This comparison will allow to determine confidence level on the estimated location derived from the SPS signals. For example, if the SPS signals are spoofed, there could be significant difference of location between cached location information and SPS derived location, which is not consistent with the non-SPS sensor information. Similarly, if the SPS signals are spoofed, the SPS derived location estimate may differ in a noticeable manner from the location information received from other UEs.

The confidence level for the SPS derived location estimate may be determined based on the magnitudes and types of differences between the SPS derived location estimate and the non-SPS information. By way of example, if the non-SPS information and SPS derived location estimate differ by only small amounts or if data from only a single non-SPS sensor differs, while the remaining non-SPS sensors closely match, then the confidence level may be relatively high. In contrast, if the differences are large or all non-SPS sensors indicate a significant difference, then the confidence level may be relatively low. In the determination of the confidence level, the data from different of sensors may be weighted differently. If the SPS derived location estimate is compared to a non-SPS derived location estimate (e.g., generated in block 516), the confidence level in the SPS derived location estimate may be high if the location estimates closely match or are within corresponding uncertainty ranges, and conversely may be low if there is a discrepancy in the location estimates or they are outside the uncertainty ranges.

In some implementations, the SPS derived location estimate (from block 502) may be continuously compared to cached location information (from block 506) and in some implementations to location information from the sensors (from block 508). For example, an SPS derived location estimate may be generated continuously, e.g., at a rate of 10 Hz, and each SPS derived location estimate may be compared to the previous cached location from block 506. The previous cached location may be updated based on estimated movement of the vehicle, e.g., vehicle speed and direction, obtained from the location information from the sensors (block 508), e.g., dead reckoning. The difference between the SPS derived location estimate and the updated cached location (e.g., dead reckoning position) may be compared to a predetermined threshold to determine if they adequately match. In some implementations, the predetermined threshold may be based on the speed of the vehicle. If the comparison succeeds, a high confidence level, e.g., 0.90, may be set based on that filter, while if the comparison fails, a low confidence level, e.g., 0.20, may be set based on that filter. In some implementations, the confidence level may be a function of the difference in the comparison, e.g., multiple predetermined thresholds may be used to generate different confidence levels.

In some implementations, additional filtering steps may be performed that may increase or decrease the confidence level further. For example, if the initial comparison between the SPS derived location estimate and the updated cached location (e.g., dead reckoning position) fails, additional factors, such as locations derived from other sensors and locations received from other UEs (from block 504) may be used to modify the confidence level. For example, the SPS derived location estimate may be compared to a non-SPS derived location estimate, e.g., determined using multilateration based on locations received from other UEs (from block 504) and ranges to the other UEs (from block 508) or, e.g., a cellular based location estimate, or any other positioning information, e.g., vision based positioning, wireless local area network (WLAN) based positioning, wireless personal area network (WPAN) based positioning, etc. In some implementations, the comparison of the SPS derived location estimate and the non-SPS derived location estimate may be compared to a predetermined threshold (or a number of thresholds) to determine if the match fails or succeeds and corresponding confidence level. The threshold(s), for example, may be based on the speed of the vehicle. If the match(es) in the subsequent filters fail, the confidence level may be further reduced, or conversely, if the match(es) in the subsequent filters succeed, the confidence level may be increased.

In some implementations, instead of performing multiple filters, a single non-SPS derived location estimate may be generated based on all available information, e.g., cached location (block 506), sensor information (block 508), and location of other UEs (block 504), which may be compared to the SPS derived location estimate. The resulting difference may be compared to one or more thresholds to generate a corresponding confidence level. The thresholds, for example, may be based on the speed of the vehicle.

Table 1, by way of example, illustrates various confidence levels that may be generated based on the comparison of the SPS derived location estimate and non-SPS derived location information, and related explanations. If desired, other confidence levels may be used, and additional confidence levels may be included with different actions undertaken in response to the comparison.

TABLE 1

| Confidence level | Explanation |
|---|---|
| Confidence <.90 | Host vehicle SPS information is not reliable, use non SPS location information |
| Confidence >.90 | SPS information is reliable. Use SPS information |

At block 512, the confidence level determined at block 510 may be compared to a predetermined threshold, e.g., as illustrated in Table 1. If the confidence level in the SPS derived location estimate is higher than the predetermined threshold, the UE may transmit location information including the SPS derived location estimate to other UEs, along with source of the location estimate at block 514. In some implementations, the location information may further include the confidence level for the location estimate. The message, for example, may be a CAM, DENM, or BSM message that is sent via a C-V2X or other type of communication. The cached location information at block 506 may be updated accordingly.

On the other hand, if the confidence level in the SPS derived location estimate is lower than the predetermined threshold at block 512, the SPS derived location estimate is considered unreliable, and the UE will not transmit the SPS derived location estimate to other UEs. Instead, the UE may transmit location information to other UEs that includes a location estimate determined from non-SPS information.

For example, at block 516, the UE may derive a location estimate using non-SPS information, including the cached location information from block 506, non-SPS sensor information at block 508 (e.g., using dead reckoning or other position determination techniques), and location information received from other UEs, e.g., at block 504. For example, where location information from a plurality of trusted UEs is received, this crowd sourced information may be used to help estimate the current location of the UE, e.g., using ranging information to the trusted UEs derived using radar, lidar or wireless ranging techniques such as round trip time measurements. The location estimate, for example, may be determined by the position engine 235 and one or more processors 210 implementing the location determination module 282 in FIG. 2. The confidence level in the non-SPS derived location estimate may be determined, e.g., based on confidence levels of the non-SPS data used, e.g., the confidence level in the cached location information and the confidence levels in the location information received from other UEs. In some implementations, the confidence level in the non-SPS derived location estimate may be derived in a manner similar to the confidence level derived for the SPS derived location estimate, as discussed above. For example, a non-SPS derived location estimate may be generated and compared to previous cached location, which may be updated based on estimated movement of the vehicle, e.g., vehicle speed and direction, using dead reckoning. The difference may be compared to one or more predetermined thresholds to determine if they adequately match and corresponding confidence levels generated. The UE may transmit the location information including the non-SPS derived location estimate to other UEs, along with source of the location estimate at block 514. In some implementations, the location information may further include the confidence level for the location estimate. The cached location information at block 506 may be updated accordingly.

Additionally, the UE additionally send a message, e.g., to a traffic management server via an RSU or BTS, to provide an indication that the received SPS signals are anomalous and are unreliable. The message may include location information, such as non-SPS derived location estimate, and in some implementations, the source of the location estimate and confidence level, so that the traffic management server may identify whether the anomalous SPS signals are associated with a specific area or vehicle. The traffic management server, for example, may provide warnings to vehicles in an area if the anomalous SPS signals associated with that specific area.

UEs that receive location information from a transmitting UE that indicates that the source of the location estimate is non-SPS information (or otherwise indicate that the SPS derived location estimate is unreliable) may flag the transmitting UE as transmitting possibly spoofed or otherwise unreliable location information. The receiving UE may discount or weight the location information accordingly. Moreover, a UE that receives an indication that the SPS derived location estimate is unreliable may use this information to decrease the confidence level in its own SPS derived location estimate.

Figure 6:
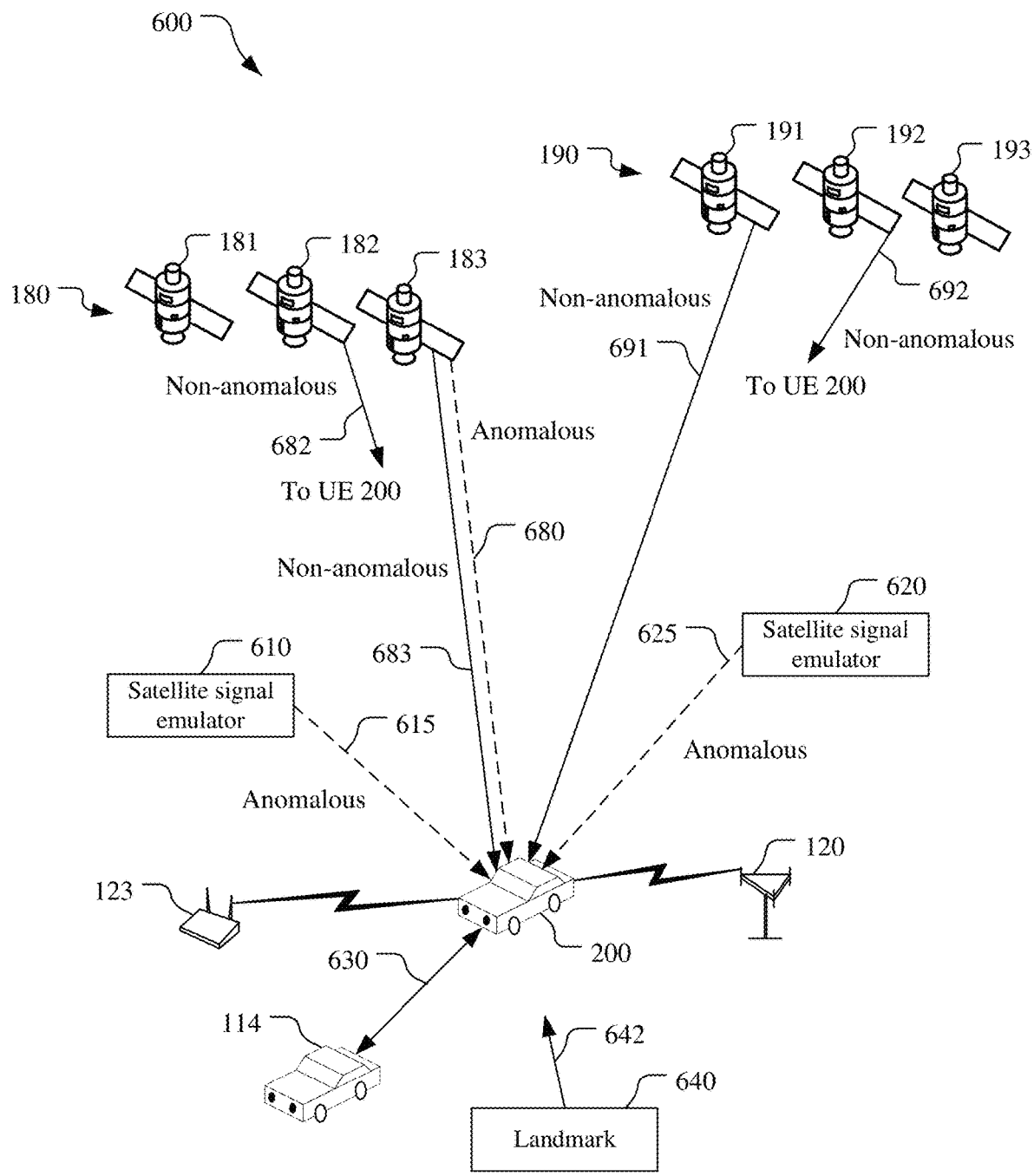
FIG. 6 is a simplified diagram of an environment in which a user equipment of FIG. 2 receives anomalous and non-anomalous signals.

FIG. 6 illustrates an example environment 600 in which the UE 200 may receive one or more anomalous SPS signals due to various scenarios and may provide location information to the UE 114 that includes a non-SPS derived position estimate, source of the location estimate, and confidence level of the location estimate. For example, the SV 183 may send an anomalous SPS signal 680 to the UE 200. The anomalous SPS signal 680 may be anomalous in one or more ways. For example, the signal 680 may be a spoofed signal, being produced with a format associated with the SV 183 but being inaccurate, e.g., having incorrect timing, which may lead to an inaccurate determination of the range from the UE 200 to the SV 183. As another example, the signal 680 may be a spoofed signal, having a format associated with another SV, e.g., another SV of the same constellation that contains the SV 183 (i.e., the constellation 180) or another SV of a different constellation, e.g., of the constellation 190. In this case, a pseudorange determined for the signal 680 may correspond to the range from the UE 200 to the SV 183 but the UE 200 will use this range as a range from the UE 200 to the expected location (e.g., as indicated by ephemeris data) of the SV 191. In either of these scenarios, i.e., inaccurate information in a signal of a format of the SV 183 or simulating a format of another SV, the UE 200 may calculate an incorrect location for the UE 200 if the UE 200 does not recognize the signal 680 as being anomalous and thus does not take appropriate action, e.g., determining and providing a non-SPS derived location estimate to the UEs, along with an indication of the source of the location estimate. The anomalous SPS signal 680 has a carrier frequency, and the carrier frequency may be a frequency often used by UEs to determine location using SPS signals, such as an L1 frequency (1575.42 MHz) of a GPS system. The SV 183 may also send one or more non-anomalous SPS signals such a non-anomalous SPS signal 683, especially if the anomalous SPS signal 680 was sent due to an operational error of the SV 183. The non-anomalous SPS signal 683 may have a different carrier frequency than the anomalous SPS signal 680.

As another example of the UE 200 receiving an anomalous SPS signal, the UE 200 may receive one or more anomalous SPS signals 615, 625 from satellite signal emulators 610, 620, respectively. The satellite signal emulators 610, 620 may be SPS signal simulators configured to produce and send signals that mimic SPS signals. The anomalous SPS signals 615, 625 may thus emulate signals from (e.g., have formats (e.g., pseudorandom codes) corresponding to) SVs such as the SVs 191, 192, respectively. The anomalous SPS signals 615, 625 may have much higher power than non-anomalous SPS signals 691, 692 from the SVs 191, 192 when received by the UE 200, which may cause the UE 200 to lock to the anomalous SPS signals 615, 625 over (instead of) the non-anomalous SPS signals 691, 692 actually sent by the SVs 191, 192.

As discussed, the UE 200 may use one or more other entities in the environment 600 to help identify anomalous signals as being anomalous, e.g., by determining consistency or inconsistency of the anomalous signal with other information. For example, the UE 200 may further use non-SPS information, such as cached location information, non-SPS sensor information, locations of other UEs, or any combination thereof to determine the reliability of the SPS signals received. For example, the UE 200 may determine that the time derived from SPS signals is not consistent with the time determined from a local oscillator or other local sources. The UE 200, for example, may determine a non-SPS derived location estimate from the non-SPS information, which may be compared to the SPS derived location estimate to generate a confidence level. In another example, the UE 200 may compare any changes in location to non-SPS sensor information, such as indications of acceleration, etc., that should correspond with changes in location. In another example, the UE 200 may be configured to determine a distance to the UE 114 using signaling 630 (e.g., radar signals, sonar signals, and/or lidar signals). The UE 200 may, for example, use this distance information and a location of the UE 114 provided by the UE 114 to the UE 200 to help determine consistency of one or more SPS signals with an approximate location of the UE 200. The UE 200 may be configured to use visual information (e.g., light rays 642 reflected off a landmark 640) to determine the approximate location of the UE 200. The UE 200 may, for example, capture one or more images of the landmark 640 using the camera 218, identify the landmark 640, find a location of the landmark 640 in a lookup table of landmarks and locations (or by inquiring another entity, such as the server 400, for this information), and using the location of the landmark 640 as an approximate location of the UE 200.

If the UE 200 determines that the SPS derived location estimate has a low confidence level, e.g., below a predetermined threshold, the UE may send location information to the UE 114 (and other UEs), that includes the non-SPS derived location estimate, the source of the location estimate (i.e., the non-SPS information), and the confidence level in the location estimate.

Figure 7:
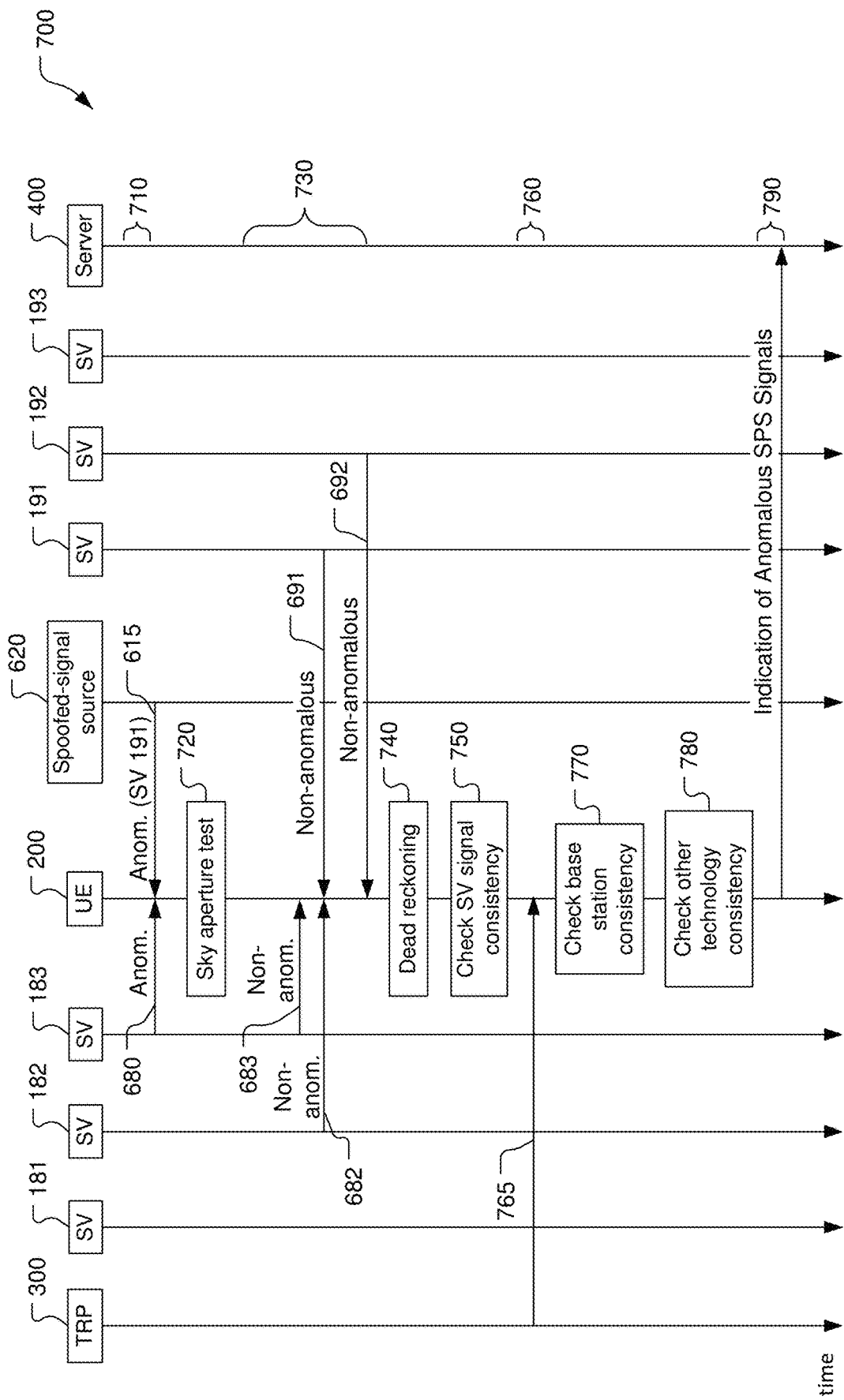
FIG. 7 is a signal and process flow for identifying an anomalous signal.

FIG. 7 illustrates a signaling and process flow 700 showing the UE 200 receiving one or more anomalous SPS signals and identifying the anomalous SPS signals as anomalous, which may correspond, e.g., to blocks 510 and 512 in FIG. 5. The flow 700 includes the stages shown but is an example only, as stages may be added, rearranged, and/or removed. Also, a limited quantity of SPS signals are shown in order to facilitate understanding, but numerous other signals may be received by the UE 200, some of which are discussed.

At stage 710, the UE 200 receives anomalous SPS signals 680, 625 from the SV 183 and the satellite signal emulator 620, respectively. The anomalous SPS signal 680 may, for example, have a format that corresponds to the SV 183 but may be in inaccurate in some way (e.g., timing, power, etc.). As another example, the signal 680 may have a format of another SV, i.e., an SV other than the source of the signal 680, in this example, the SV 183. The anomalous SPS signal 625 may have the format of an SPS signal corresponding to an SV, in this example, the SV 191.

At stage 720, the UE 200 may perform a sky aperture test to determine whether a received signal is expected to be received and/or whether a received signal originated from an expected region of the sky. For example, the anomaly detection module 284 may be configured to use an estimate of the location of the UE 200 to determine which SVs should be visible and/or which SVs should not be visible to the UE 200. The estimate of the location of the UE 200 may be determined using one or more of various techniques such as dead reckoning based on a previously determined location, or using a known location of a serving base station as the estimated location, or another technique. The module 284 may be configured to determine expected visibility based on ephemeris data (indicative of current and future SV locations) for one or more constellations of SVs and an approximate location of the UE 200. The approximate location of the UE 200 may be based, e.g., on a received base station signal and known location of the base station sending the signal, a previously determined location of the UE and time since the determination of that location, etc. The anomaly detection module 284 may be configured to identify a signal as anomalous if the signal corresponds to an SV that should not be visible at the present approximate location of the UE 200. Also or alternatively, the anomaly detection module 284 may be configured to determine an approximate direction (possibly corresponding to a region of the sky) from which a received signal was sent. For example, the module 284 may use sensor information from one or more of the sensor(s) 213 regarding orientation of the UE 200 and an angle of arrival, relative to the UE 200, of a received signal to determine a region relative to a location of the UE 200 from which the received signal originated, i.e., a source region. The source region may be a range of angles relative to a location of the UE 200, e.g., multiple combinations of θ and φ in spherical coordinates. The source region may, for example, be a source direction determined from the angle of arrival and orientation of the UE 200, and an uncertainty around the source direction, e.g., such that the source region includes the source direction and any direction within a threshold angle (e.g., 5°) of the source direction. The module 284 may be configured to determine whether the source region corresponds to (includes) an expected location of an SV (e.g., based on ephemeris data) corresponding to the received signal (e.g., an SV that sends signals with a same format as a format of the received signal). The module 284 may be configured to identify the received signal as an anomalous SPS signal if the signal did not originate from the expected location of the SV, e.g., if the expected location is not in the determined source region. For the exaggerated example shown in FIG. 6, the module 284 may determine that for the anomalous signal 615, the source region (which would include the satellite signal emulator 610) does not include the SV 191, and thus the module 284 may label the anomalous signal 615 as anomalous.

At stage 730, non-anomalous SPS signals 682, 683, 691, 692 are sent by the SVs 182, 183, 191, 192 and received by the UE 200. The timing of the SPS signals shown are examples, and SPS signals may be received at times in addition or instead of the times shown. For example, the non-anomalous SPS signal 691 may be sent by the SV 191 and received by the UE 200 before the anomalous SPS signal 615 is sent by the satellite signal emulator 620 and received by the UE 200. The non-anomalous SPS signal 683 may, for example, have a different carrier frequency than the anomalous SPS signal 680. The non-anomalous SPS signal 691 may, for example, have the same carrier frequency as the anomalous SPS signal 615. The non-anomalous SPS signals 682, 692 may, for example, have the same carrier frequencies as the non-anomalous SPS signals 683, 691, respectively.

At stage 740, the UE 200 may perform position determination from non-SPS information, such as dead reckoning position determination. For example, the processor 210 may use one or more motion sensor measurements to determine an amount (and possibly direction) of movement of the UE 200 since the time of the previously determined position. The processor 210 may be configured to use the determined movement of the UE 200 and one or more previous SPS signal measurements (e.g., one or more raw measurements, such as time of arrival, and/or one or more processed measurements, such as pseudorange) to determine one or more expected present SPS signal measurements. For example, processor 210 may be configured to use the determined movement (e.g., magnitude and direction) and a previously determined location of the UE 200 to determine an approximate present location of the UE 200. The processor 210 may be configured to use the approximate present location of the UE 200 and a time since the previously determined location was determined to determine the expected present SPS signal measurement. The processor 210 may be configured to trigger a consistency check in response to the expected present SPS signal measurement differing from a corresponding actual present SPS signal measurement by more than a threshold amount. The threshold may take a variety of forms (e.g., a percentage, a quantity in units of the measurement (e.g., power)) and may have a variety of values.

At stage 750, the UE 200 may check SPS signal consistency to determine whether an SPS signal is anomalous. The anomaly detection module 284 may be configured to determine whether there are one or more inconsistencies regarding one or more SPS signals received by the UE 200 relative to one or more expectations. An SPS signal inconsistency may be an unexpected signal measurement determined, for example, relative to one or more other SPS signals from the same SV and/or relative to one or more other SPS signals from one or more other SVs (from the same constellation and/or one or more other constellations), and/or based on a determined location approximation. For example, the anomaly detection module 284 may be configured to determine whether an inconsistency exists between SPS signals of different bands (carrier frequencies in different bands) and/or between SPS signals of different SVs (intra-constellation and/or inter-constellation). Other examples are possible for determining SPS signal inconsistency.

The anomaly detection module 284 may be configured to determine whether an SPS signal has a received power that is inconsistent with one or more expectations. For example, the module 284 may be configured to detect that the received power differs from another received signal power by significantly more than an expected amount. The anomaly detection module 284 may be configured to determine an actual power difference between received signals and a corresponding expected power difference and determine whether the actual power difference differs from the expected power difference by more than a power threshold. The analyzed SPS signals may correspond to the same SV and may have the same or different carrier frequencies, or the analyzed SPS signals may correspond to different SVs (within the same constellation or in different constellations). For example, the anomaly detection module 284 may determine an actual power difference between the anomalous SPS signal 615 (from the satellite signal emulator 620) and the non-anomalous SPS signal 691 (from the SV 191) in response to the anomalous signal 615 having a format corresponding to (similar to or identical to) the format of signals sent by the SV 191, thus giving the appearance that the anomalous signal 615 originated from the SV 191. The anomaly detection module 284 may further determine an expected power difference for multiple SPS signals received from the SV 191. For example, for multiple SPS signals with the same carrier frequency both received from the SV 191 within a threshold amount of time of each other, the anomaly detection module 284 may determine (e.g., retrieve from the memory 211) an expected power difference that is very small. The anomaly detection module 284 may determine whether the actual power difference between the signals 615, 691 differs by more than a power threshold from the expected power difference. For example, the expected power difference for signals from the same SV within a small time window may be zero (or nearly zero), and the power threshold may be small, e.g., 1 dB. Because the anomalous signal 615 came from the satellite signal emulator 620, the power of the signal 615 may be much higher than the power of the signal 691, and thus the difference in power between the signals 615, 691 may be much higher than 1 dB, in response to which the anomaly detection module 284 may identify the signal 615 as anomalous (and/or identify the signal 691 as anomalous). Comparing signals over time that are supposedly from the same SV and have the same carrier frequency may help detect introduction of a spoofed SPS signal. As another example, the anomaly detection module 284 may determine actual and expected power differences for the signals 615, 691, where the signals 615, 691 have different frequencies. In this case, the expected power difference may be small (e.g., zero or close to zero) and the power threshold may be small, e.g., 1 dB. Comparing signals from the same SV but with different frequencies may help identify spoofed signals as signals may only be spoofed for an SV (or a constellation) for one carrier frequency (or at least less than all carrier frequencies). As another example, the anomaly detection module 284 may determine actual and expected power differences between the anomalous SPS signal 615 and another SPS signal of another SV, e.g., one of the SPS signals 682, 683, 692. The anomaly detection module 284 may determine the expected power difference based on ephemeris data for the appropriate SV 182, 183, 192 and an approximate location of the UE 200. The power threshold may depend on the expected power difference, or may be independent of the power difference, e.g., being a percentage or amount of decibels. Comparing signals from different SVs may help identify spoofed signals as signals may only be spoofed for one constellation (or at least less than all constellations). For example, if the UE 200 is indoors, all SPS signals will typically be received with very low power if at all, but spoofed SPS signals may be received with much higher power than the actual SPS signals, and with adequate power for location determination. The SVs may be selected based on their visibility to the UE 200 and/or their relative position in the sky. For example, the anomaly detection module 284 may select SPS signals for SVs that are close enough to each other that the attenuation and/or multi-path effects for the SPS signals from the SVs are likely to be similar, e.g., such that the expected power difference will be near zero.

Received power inconsistency over time and/or between SVs (e.g., between constellations) may be particularly helpful in identifying indoor SPS signal spoofing. For example, if the anomaly detection module 284 determines that an SPS signal from an SV in one constellation, e.g., the SV 181 in the constellation 180, decreases in power (e.g., due to the UE 200 moving from being outdoor to indoor) but that the received power from an SPS signal purportedly from another SV of another constellation, e.g., the SV 191 of the constellation 190, increases or at least does not decrease similarly to the power decrease of the SPS signal from the SV 181, then the anomaly detection module 284 may identify the SPS signal from the SV 191 as anomalous. The anomaly detection module 284 may be configured to analyze the SPS signals from multiple SVs of multiple constellations such that the anomaly detection module 284 may identify SPS signals of one constellation as anomalous where the received power of these SPS signals do not decrease in power nearly as much as (or even increase in power relative to) the received power of multiple SPS signals from another constellation.

The anomaly detection module 284 may be configured to determine whether an SPS signal has a corresponding pseudorange that is inconsistent with expectation. For example, the anomaly detection module 284 may be configured to determine that a pseudorange to an SV based on a time-filtered location determination differs by more than a pseudorange threshold relative to a pseudorange determined using an SPS signal purportedly from that SV. The anomaly detection module 284 may use a filter result (e.g., a Kalman filter result) for a location of the UE 200 to determine an expected pseudorange to an expected location of an SV based on ephemeris data. The anomaly detection module 284 may determine measured pseudorange to the SV based on a measured SPS signal corresponding to the SV (e.g., having a format of signals from the SV). The anomaly detection unit may identify the measured SPS signal as anomalous if the expected pseudorange differs from the measured pseudorange by more than the pseudorange threshold, e.g., 1%, or 5%, or 10%. This may help identify a signal from an SV of one constellation that emulates a signal from another constellation as anomalous. As another example, the anomaly detection module 284 may be configured to determine that a pseudorange based on received (actual or spoofed) SPS signals purportedly from the same SV deviates from an expectation by more than a pseudorange threshold. For example, the anomaly detection module 284 may identify a change in pseudorange of more than 1% or more than 5% or more than 10% between pseudorange determinations to indicate that the SPS signal corresponding to the later pseudorange determination is anomalous. The value of the pseudorange threshold may be a function of the time between reception of the SPS signals corresponding to the pseudoranges being compared (e.g., with the pseudorange threshold having a higher value (e.g., a higher percentage) the longer the time between signal reception leading to the pseudoranges being compared). As another example, the anomaly detection module 284 may be configured to determine whether a pseudorange difference based on measured SPS signals differs by more than a threshold amount from an expected amount. Similar to the discussion above with respect to power differences, the anomaly detection module 284 may determine a measured pseudorange difference based on measured signals, e.g., the anomalous signal 615 and the non-anomalous signal 692, and determine an expected pseudorange difference to the corresponding SVs 191, 192 (e.g., based on an approximate location of the UE 200 and ephemeris data for the SVs 191, 192), and identify at least one of the signals 615, 691 as anomalous if the difference between measured pseudorange difference and the expected pseudorange difference differ by more than a threshold amount, e.g., 1%, 5%, 10%.

The anomaly detection module 284 may select which SPS signals to use to perform a consistency check, e.g., to determine received power differences and/or pseudorange differences. For example, the anomaly detection module 284 may be configured to select one or more SPS signals corresponding to one or more respective SVs based on a priority of SVs and/or constellations. The anomaly detection module 284 may, for example, select SPS signals for SVs based on levels of trust for the SVs and/or constellations, and/or based on one or more other criteria. For example, a native SPS (i.e., an SPS owned by a country associated with the UE 200) may be given a highest level of trust. For example, GPS may be given highest trust (relative to other SPSs) by a UE associated with (e.g., believed to be presently in, or purchased in) the United States of America, Galileo by a UE associated with Europe, Beidou by a UE associated with China, and GLONASS by a UE associated with Russia. Non-native SPSs may be given lower trust, e.g., in a hierarchy of trust that may depend, for example, on the native SPS. The UE 200 may use the SPSs in order of trust, for example, using the most trusted SPS or the two most trusted SPSs to determine an approximate location of the UE 200, and use this approximate location to check consistency with one or more of the remaining SPSs.

At stage 760, the UE 200 receives a base station signal 765 from the TRP 300 (e.g., one or more of the base stations 120-123 or another base station). The base station signal 765 may include a positioning signal (e.g., a PRS) and/or a communication signal.

At stage 770, the base station signal 765 may be used by the anomaly detection module 284 detect consistency between the base station signal 765 and one or more SPS signals. For example, the anomaly detection module 284 may be configured to use the base station signal 765 from the TRP 300 (e.g., from the BTS 120 or the BTS 123 as shown in FIG. 6) to determine an approximate location of the UE 200. The module 284 may be configured to use the approximate location to determine one or more expected received powers of one or more SPS signals and/or to determine one or more expected pseudoranges to one or more SVs. The module 284 may be configured to determine whether the expected received power(s) and/or the expected pseudorange(s) is(are) consistent with measured received power(s) and/or pseudorange(s) determined from a measured SPS signal or measured SPS signals. For example, the module 284 may determine whether measured and expected received powers differ by less than a power threshold and/or whether measured and expected pseudoranges differ by less than a pseudorange threshold.

At stage 780, the UE 200 may perform a consistency check using one or more other technologies, i.e., non-SPS technologies. For example, the anomaly detection module 284 may be configured to obtain location information based on radar, Lidar, WAN, and/or Wi-Fi technologies as such information is available. The anomaly detection module 284 may be configured to use the location information obtained by one or more of these other technologies to determine whether a location of the UE 200 according to such information is consistent with one or more SPS signals, e.g., consistent with received power level and/or determined pseudorange or location. For example, the anomaly detection module 284 may obtain an approximate location using the signaling 630 (e.g., radar, lidar, sonar) between the UE 200 and the UE 114 to determine the approximate location of the UE 200 based on a location of the UE 114 and a distance between the UE 114 and the UE 200. As another example, the anomaly detection module 284 may use visual information to determine the approximate location of the UE 200, e.g., by using visual information to recognize the landmark 640 and use a location of the landmark (e.g., either stored in the memory 211, provided by the landmark 640, or provided by another entity such as the server 400) as the approximate location of the UE 200. The anomaly detection module 284 may combine technologies, e.g., using visual information of the landmark to identify the landmark and obtain the location of the landmark, using radar to determine a distance from the landmark, and using this distance and the landmark location to determine the approximate location of the UE 200. As another example, the anomaly detection module 284 may use information regarding constraints on the location of the UE 200 to help identify SPS signals as anomalous. For example, the anomaly detection module 284 may use map information and information as to characteristics of the UE 200 and/or a vehicle in which the UE 200 resides. Thus, for example, the anomaly detection module 284 may compare determined location and/or pseudorange corresponding to an SPS signal to identify an SPS signal as anomalous that indicates that the UE 200 is in an impossible (or at least highly unlikely) location, such as on land if the UE 200 is (or resides in) a boat, is in water if the UE 200 is (or resides in) a land vehicle such as car or truck, is displaced significantly from train tracks if the UE 200 is (or resides in) a train, etc. As another example, the UE 200 may check with one or more other UEs within communication range to determine whether a location determined by the other UE(s) corresponds to an SPS signal measurement obtained by the UE 200. For example, the UE 200 may request a location of another UE and/or may receive a notification (e.g., a safety notification) pushed by another UE (e.g., the UE 114 shown in FIG. 6) that indicates a location of the other UE. The UE 200, e.g., the anomaly detection module 284 may determine whether the location indicated by the notification or provided in response to the request is consistent with an SPS signal measurement (e.g., pseudorange, location (e.g., a time-filtered location), etc.) obtained by the UE 200 from a received SPS signal to determine whether the received SPS signal is anomalous.

The anomaly detection module 284 may be configured to re-perform one or more consistency checks of stage 750, and/or to perform one or more of the consistency checks of stages 770, 780. The anomaly detection module 284 may be configured to perform such checks for every signal or based on one or more criteria such as every Nth SPS signal or in response to identifying an SPS signal as anomalous at stage 750. The anomaly detection module 284 may be configured to perform different consistency checks and/or different amounts of consistency checks based on a sensitivity level of knowledge of the location of the UE 200. For example, the anomaly detection module 284 for a smartphone may be configured not to perform consistency check beyond SPS signal checking at stage 750 for an exercise application, but the anomaly detection module 284 for a military aircraft may be configured to perform every consistency check for which information is available. Checking, and re-checking, consistency of an anomalous SPS signal may help confirm or contradict the initial identification of an SPS signal as anomalous. If an SPS signal is identified as anomalous but subsequent consistency checking reveals that the SPS signal is consistent with one or more other SPS signals and/or other forms of consistency checking, then the SPS signal may be re-identified as not anomalous.

At stage 790, the anomaly detection module 284 may send a message to server 400, which may be a traffic management server, to provide an indication that the received SPS signals are anomalous and are unreliable. The message may include location information, such as non-SPS derived location estimate, and in some implementations, the source of the location estimate and confidence level, so that the traffic management server may identify whether the anomalous SPS signals are associated with a specific area or vehicle. The traffic management server, for example, may provide warnings to vehicles in an area if the anomalous SPS signals associated with that specific area.

Figure 8:
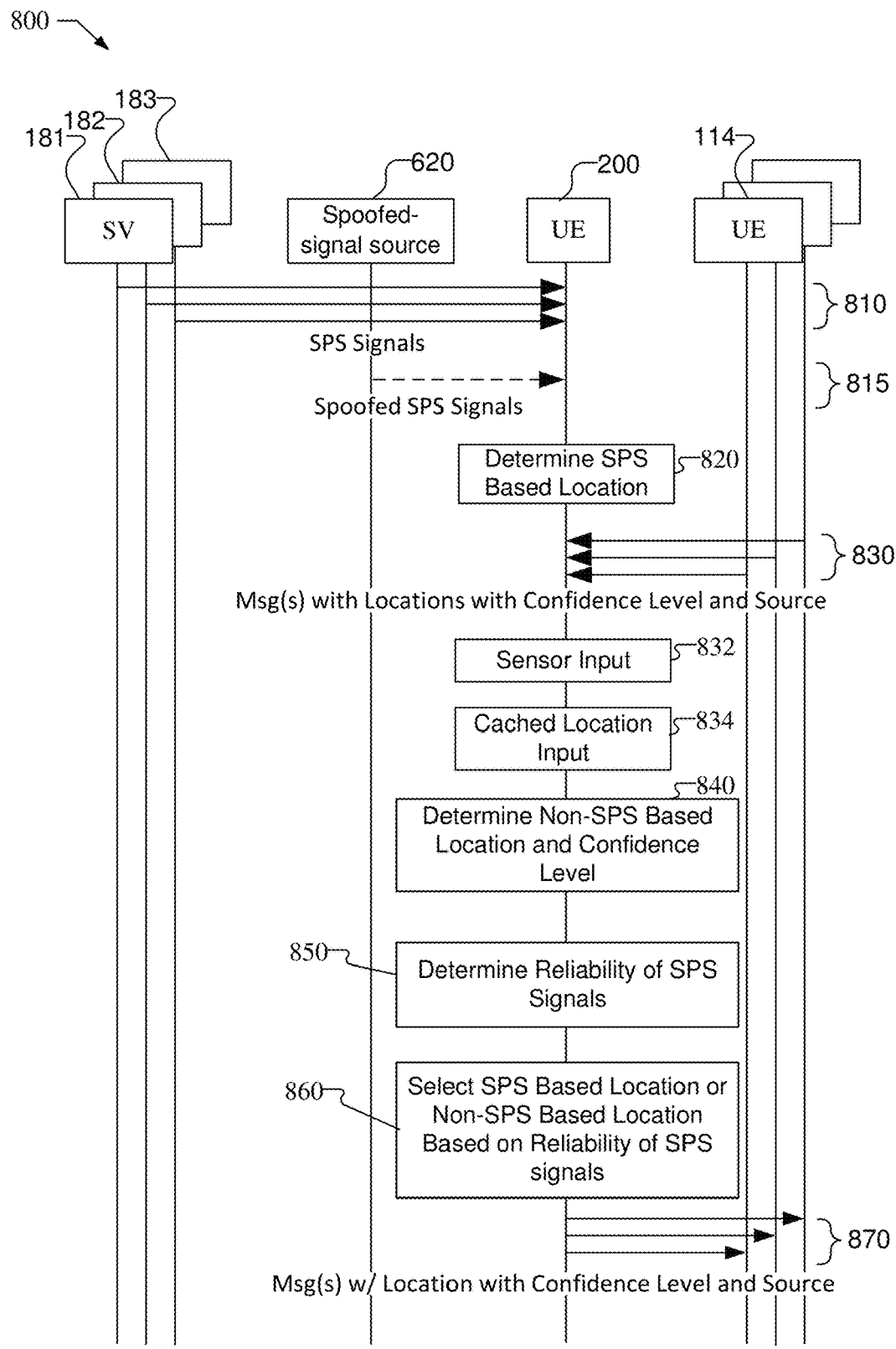
FIG. 8 is a signaling and process flow for determining confidence in an SPS derived position estimate and transmitting location estimate with the source of the estimate to other UEs.

FIG. 8 illustrates a signaling and process flow 800 showing the UE 200 receiving SPS signals, determining whether the SPS signals are anomalous and sending location information to other UEs that include a location estimate and source of the location estimate, and in some implementations, the confidence level in the location estimate. The flow 800 includes the stages shown but is an example only, as stages may be added, rearranged, and/or removed. Also, a limited quantity of SPS signals are shown in order to facilitate understanding, but numerous other signals may be received by the UE 200, some of which are discussed.

At stage 810, non-anomalous SPS signals are sent by the SVs 181, 182, 183 and received by the UE 200.

At stage 815, the UE 200 may receive anomalous SPS signals from the satellite signal emulator 620. The anomalous SPS signal may, for example, have a format that corresponds to the SV 183 but may be in inaccurate in some way (e.g., timing, power, etc.). The timing and number of the SPS signals shown are examples, and additional or different SPS signals may be received at times in addition or instead of the times shown. For example, the non-anomalous SPS signal may be sent by the SVs and received by the UE 200 after the anomalous SPS signal is sent by the satellite signal emulator 620 and received by the UE 200. The anomalous SPS signals may have the same or different carrier frequency as some or all of the non-anomalous SPS signals.

At stage 820, the UE 200 may determine an SPS based location estimate using received SPS signals from stage 810 and the anomalous SPS signals received at stage 815 (if any). The processor 210 may be configured to use SPS signal measurements, such as time of arrival, and/or one or more processed measurements, such as pseudorange, to determine an SPS derived estimated location for the UE 200.

At stage 830, the UE 200 receives wireless messages from one or more other UEs 114, e.g., via transceiver 240 shown in FIG. 2, that include the location estimate of each transmitting UE, the source of the location estimate (e.g., whether the location estimate is derived from SPS signals or from non-SPS signals), and the confidence level of the location estimate. The wireless messages may be V2X or other types of messages, e.g., used for ADAS, such as CAM, DENM, or BSM. The UE 200 may further receive a message broadcast by a traffic control server, which may indicate whether anomalous SPS signals have been reported in the area of the UE 200.

At stage 832, the UE 200 may acquire data input from non-SPS based sensors, such as IMU sensors, cameras, wireless transceivers, etc. The data input, for example, may include data related to acceleration, orientation, velocity, wheel revolution counts, radar data, lidar data, image information, etc. It should be understood, of course, that the sensor input data is not necessarily acquired at one particular moment, but may be acquired continuously over time as the data becomes available.

At stage 834, the UE 200 acquires its cached location data, e.g., one or more previous location estimates stored by UE 200. The location data may include the source of the location estimate (e.g., whether the location estimate is derived from SPS signals or from non-SPS signals), and the confidence level of the location estimate.

At stage 840, the UE 200 may determine a non-SPS derived location estimate, e.g., using non-SPS information, such as the cached location information, sensor data, and location information received from other UEs, e.g., as discussed in reference to FIG. 5. For example, the processor 210 may further be configured to use one or more sensor measurements to determine an amount (and possibly direction) of movement of the UE 200 since the time of a cached location estimate, e.g. using dead reckoning. The processor 210 may further be configured to use location information from other UEs, if reliable, to assist in determining a location estimate, e.g., using ranging information to the other UEs, derived from radar, lidar, or wireless ranging techniques, such as round trip time measurements. The processor 210 may be configured to use the confidence levels associated with cached location information and the location information from other UEs to assist in position determination, e.g., by weighting reliable information more than unreliable information, and to determine the confidence level of the determined location estimate.

At stage 850, the UE 200 determines whether the received SPS signals are reliable, e.g., as discussed in FIG. 5 and FIG. 7. For example, the UE 200 may determine a confidence level in the SPS derived location estimate. For example, confidence level in the SPS derived location estimate may be determined as discussed in FIGS. 5, 6 and 7. The processor 210 may be configured to use movement of the UE 200 determined from the sensors, the cached location input, locations of other UEs, or a combination thereof, to determine whether the SPS derived location estimate is reliable. For example, the local time for the UE 200, e.g., derived from a local oscillator or from BTSs via wireless communications, may be compared to the SPS time derived from the SPS signals. In another example, the SPS derived location estimate may be compared to cached location information or locations of the other UEs. In another example, changes in position of the UE 200, e.g., based on the difference between the SPS derived location estimate and the previous location estimates from the cached location information, may be compared to sensor information, such as acceleration data, orientation data, etc. In another example, the SPS derived location estimate may be compared to the non-SPS derived location estimate. The processor 210 may be configured to determine a confidence level for the SPS derived location estimate based on the magnitude of its variations with respect to expectations and source of the variations. The processor 210 may be configured to determine reliability of the SPS signals, e.g., based on information received from other UEs, e.g., in stage 830, such as the source of location information, confidence level of location estimate, or a warning that received SPS signal are determined to be anomalous. The processor 210 may be configured to determine a confidence level using a single filter, e.g., deriving a single non-SPS derived location estimate from all available non-SPS location information at stage 840, that is compared to the SPS derived location estimate, or in multiple filters, e.g., deriving a first non-SPS derived location estimate (e.g. based on cached location information and speed and direction information) at stage 840, to generate an initial confidence level at the update rate of the SPS position fix, and if the confidence level is low to derive additional location information, such as a second non-SPS derived location estimate (e.g. based on other UE location information and sensor information) at stage 840, to update (i.e., increase or decrease) the confidence level.

At stage 860, the UE 200 selects the SPS derived location or the non-SPS derived location based on the reliability of the SPS signals. For example, the processor 210 may be configured to check the confidence level against a predetermined threshold. If the confidence level is below the threshold (indicating low confidence), the processor 210 may select the non-SPS derived location estimate, and if the confidence level is above the threshold (indicating high confidence), the processor 210 may select the SPS derived location estimate.

At stage 870, the UE 200 sends wireless messages to one or more other UEs 114, e.g., via transceiver 240 shown in FIG. 2, that include the selected location estimate, the source of the location estimate (e.g., whether the location estimate is derived from SPS signals or from non-SPS information, and in some implementations, the type of non-SPS information). In some implementations, the confidence level of the location estimate may also be sent. The wireless message may be C-V2X or other types of messages, e.g., used for ADAS, such as CAM, DENM, or BSM. If the UE 200 selects non-SPS derived location estimate, the UE 200 may further send a message to a traffic control server, to indicate that anomalous SPS signals have been detected by the UE 200, and may include the location information, e.g., non-SPS derived location estimate, source of the location estimate, and the confidence level of the location estimate.

Figure 9:
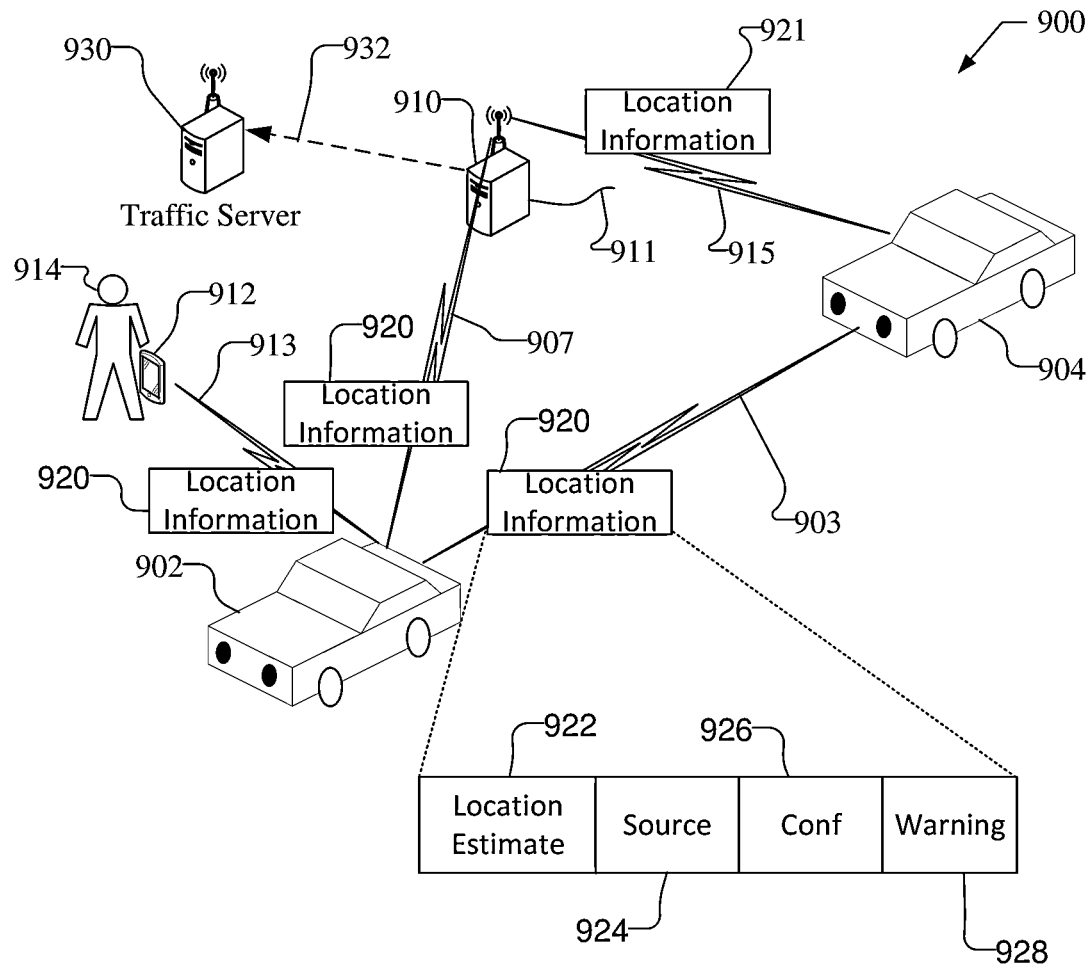
FIG. 9 illustrates a wireless communication system and transmission of a location information message that includes a location estimate and the source of the location information used to determine the location estimate.

FIG. 9 illustrates a wireless communication system 900 illustrating UEs 902 and 904 (illustrated as vehicles) transmitting a wireless location information message to provide a location estimate for the UE as well as the source of the location information to other one or more other entities. As illustrated in FIG. 9, the UE 902 may wireless communicate with other entities, such as UE 904 (illustrated as another vehicle) via communication link 903, UE 910 (illustrated as an RSU) via communication link 907, and a UE 912 (held by pedestrian 914) via a communication link 913. The UE 904 is illustrated as also wirelessly communicating with UE 910 via a communication link 915. The communications may be direct communications using any suitable signaling, such as PC5 interface, e.g., DSRC or C-V2X, or may be indirect communications using infrastructure such as RSU 910 or via Uu interface, mmWave or any wireless connection using base stations (e.g., as illustrated in FIG. 1).

FIG. 9 illustrates UE 902 transmitting a location information message 920 to UE 904, which may likewise be sent to UE 910 and UE 912, e.g., using broadcast, multicast or unicast transmissions. Moreover, the various UEs 904, 910 and 912 may provide similar location information messages to UE 902 and to each other, e.g., as illustrated by location information message 921 sent from UE 904 to UE 910, which may also be sent to UE 902 via communication link 903. The location information messages 920 and 921, for example, may be the same as the messages sent at stages 830 and 870 in FIG. 8. Location information message 921 may have the same format as location information message 920, although the content of the location information messages 920 and 921 are specific for the UEs 902 and 904, respectively.

In some implementations, the location information message 920 may be divided into two or more parts, including a first part 922 that includes the location estimate determined for the UE 902, and a second part 924 that includes a source of the location information used to derive the location estimate. The location information message 920 may further include a third part 926 that provides a determined confidence level for the location estimate. The location information message 920 may further include a fourth part 928 that indicates that the received SPS signals were determined to be anomalous (e.g., the UE 902 is under SPS spoofing attack).

For example, the various parts 922, 924, 926, and 928 of the location information message 920 may be different information elements (IEs). The IE 924 may indicate the source of the location information used to generate the location estimate in IE 922. The source of the location information in IE 924 may simply identify whether the source of the location information is SPS or non-SPS. In other implementations, the source of the location information in IE 924 may identify the type of information used to generate the location estimate, such whether the source is from SPS signals, cellular signals, local area network (LAN) signals, sidelink signals (e.g., from other UEs or RSUs), time difference of arrival (TDOA), angle of arrival (AoA), and received signal strength (RSS). In some implementations, the IE 924 may include a multibit value that is used to identify the type of source of location information from an enumerated list of sources. Table 2, by way of example, illustrates an application-layer IE that may provide the positional source using enumerated values, that may be included in the source IE 924 of the location information message 920. Of course, other sources may be enumerated as appropriate.

TABLE 2

| Data Element (DE) | Description |
| --- | --- |
| PositionLocationSource | PositionLocationSource ::= ENUMERATED { <br> Unavailable (0), <br> SPS (1), --SPS based position <br> Cell (2), --Cell Site based position <br> TDOA (3), --TDOA based position <br> AOA (4), --AOA based position <br> RSS (5), --Received Signal Strength based position <br> LAN (6), --LAN based position <br> SL (7), --Sidelink based position <br> Hybrid (8), --Non-SPS hybrid based position <br> } —Encoded as a 3 bit value |

In some implementations, the source IE 924 in the location information message 920 may indicate the source of the location information using a binary variable, e.g., as SPS or non-SPS. Table 3, by way of example, illustrates an application-layer IE that may provide the positional source as SPS or non-SPS, that may be included in the source IE 924 of the location information message 920.

TABLE 3

| Data Element (DE) | Description |
| --- | --- |
| PositionLocationSource | PositionLocationSource ::= CHOICE { <br> SPS <br> Non-SPS <br> . . . <br> } |

The receiving UE 904 (or any of UEs 910 and 912) may use the source of the location information in the location information message 920 to assist in their own location determination and determination of whether received SPS signals may be anomalous. For example, if the UE 904 receives location information messages from multiple sources, where some of the location information messages indicate the source of the location information is SPS signals, while other location information messages indicate the source of the location information is SPS signals, then the UE 904 may select to use location estimates from other UEs which are sourced from SPS signals for assistance in location determination. The UE 904, for example, may use location estimates from other UEs which are sourced from SPS signals as a filter to verify whether SPS signals received by the UE 904 may be anomalous (e.g., as discussed in FIG. 5), and may determine a location estimate using received SPS signals if the SPS signals are determined to be reliable, and otherwise to use non-SPS information (such as the location estimates from other UEs which are sourced from SPS signals and ranges to the other UEs e.g., in sidelink positioning, or a previous cached location and sensor information, e.g., dead reckoning. Moreover, if multiple other UEs report that their source of location information is non-SPS based information, the UE 904 may be triggered to check the validity, or to decrease the confidence level, in its own SPS derived location estimate. Thus, the source of the location information from other UEs, may be used for autonomous driving/cooperative driving use cases.

Additionally, the location information message 920 may include an IE that includes the confidence level for the location estimate, which may likewise be used for determining a location estimate and determining a confidence level in the location estimate, as discussed above, e.g., in FIG. 5.

Additionally, if a UE 902 has determined that it is under an SPS spoofing attack (or otherwise receiving anomalous SPS signals that cannot be relied upon), the UE 902 may include an IE 928 in the location information message 920 warning that its received SPS signals are unreliable. The indication of unreliable SPS signals (e.g., due to SPS spoofing attack or other anomalous signals) may be provided to other UEs, e.g., UE 904, which may use the warning to reduce the chance of mis-identifying the UE 902 as a "rogue" vehicle, and may trigger its own validation of SPS signals. An indication of unreliable SPS signals may be explicitly provided by the UE 902 as a separate IE 928, e.g., as a single bit, or may be implicitly provided when the position location source IE 924 indicates that the source of location information is non-SPS.

As illustrated in FIG. 9, a traffic server 930 may be present and connected to RSU 910 via communication link 932, e.g., which may be a backhaul link 911 or a wireless connection via a network 130 as illustrated in FIG. 1. The traffic server 930, for example, may be a spectrum misbehavior authority that may be used to collect reports of, e.g., V2X, misbehavior reports in order to detect unauthorized use of a licensed band. Latency, however, is an issue when relying on a centralized authority for identification of RF issues. For example, for safety applications and advance applications such as cooperative driving, delays in obtaining information related to RF issues or misbehaviors are undesirable. Accordingly, in some implementations, an RSU 910 (or other sidelink UEs) may be used to identify signal misbehaviors.

In one implementation, an RSU 910 may be used to detect unreliable SPS signals based on the location information messages provided by one or more UEs. For example, the RSU 910 may receive location information messages 920 and 921 from UEs 902 and 904 and may determine from the content of one or more of the location information messages 920 and 921 whether the SPS signals in the area of the RSU 910 are unreliable. The RSU 910 may report the presence of unreliable SPS signal to a competent authority, e.g., as illustrated traffic server 930 and/or to UEs 902 and 904.

Figure 10:
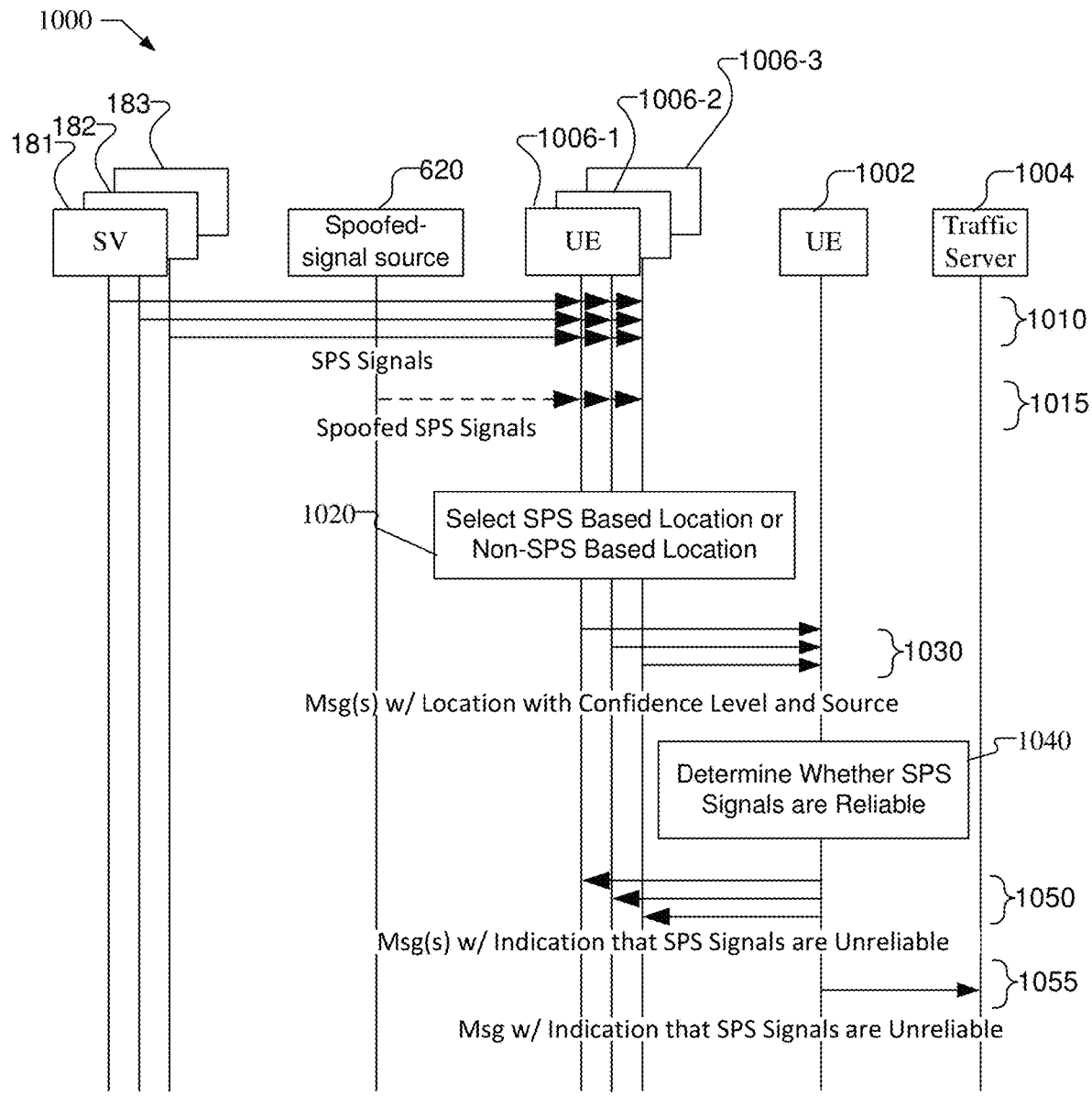
FIG. 10 illustrates a signaling and process flow showing detection of unreliable SPS signals based on location information messages received from other UEs.

FIG. 10 illustrates a signaling and process flow 1000 showing detection of unreliable SPS signals by a UE 1002 based on location information messages received from UEs 1006-1, 1006-2, 1006-3 (sometimes collectively referred to as UEs 1006). The UE 1002 may be an RSU, and may be referred to herein as RSU 1002, but may be another V-UE, sidelink UE, pedestrian held UE, or a smart device. The UEs 1006, for example, may be the same as UE 200 and may each individually determine whether received SPS signals are anomalous and send location information to other UEs and the RSU 1002. The flow 1000 includes the stages shown but is an example only, as stages may be added, rearranged, and/or removed. Also, a limited quantity of UEs 1006 and SPS signals are shown in order to facilitate understanding, but numerous other signals and UEs may be included.

At stage 1010, non-anomalous SPS signals are sent by the SVs 181, 182, 183 and received by the UE 1006.

At stage 1015, the UE 1006 may receive anomalous SPS signals from the satellite signal emulator 620. The anomalous SPS signal may, for example, have a format that corresponds to the SV 183 but may be in inaccurate in some way (e.g., timing, power, etc.). The timing and number of the SPS signals shown are examples, and additional or different SPS signals may be received at times in addition or instead of the times shown. For example, the non-anomalous SPS signal may be sent by the SVs and received by the UE 1006 after the anomalous SPS signal is sent by the satellite signal emulator 620 and received by the UE 1006. The anomalous SPS signals may have the same or different carrier frequency as some or all of the non-anomalous SPS signals.

At stage 1020, the UEs 1006 may determine whether the received SPS signals are anomalous and select to use SPS signals or non-SPS information for a location estimate as described, e.g., in stages 820-860 in FIG. 8, and elsewhere herein.

At stage 1030, the RSU 1002 may be configured to receive wireless messages, e.g., via transceiver 240 shown in FIG. 2, from UEs 1006 that include the selected location estimate and the source of the location estimate (e.g., whether the location estimate is derived from SPS signals or from non-SPS signals). The messages sent in stage 1030, for example, may be similar to stage 870 shown in FIG. 8. In some implementations, the messages may further include the confidence level of the location estimate and/or an indication of whether the received SPS signals were detected to be anomalous. The wireless message may be V2X or other types of messages, e.g., used for ADAS, such as CAM, DENM, or BSM.

At stage 1040, the processor 210 in an RSU 1002 may be configured to determine whether the SPS signals are reliable, based on one or more messages received from the UEs 1006.

The RSU 1002, for example, may determine from one or more location information messages 1030 whether the SPS is reliable or unreliable in the area around RSU 1002 (e.g., an area within wireless range to the RSU 1002 by UEs 1006). For example, in some implementations, the RSU 1002 may determine from the source of information in the location information messages 1030 whether the location estimate is derived from SPS signals or from non-SPS signals. If a large number of vehicles are generating location estimates based on non-SPS signals, the RSU 1002 may determine that the SPS signals in the area around the RSU 1002 are unreliable. For example, if the number of UEs that are deriving location estimates based on non-SPS signals (within a predetermined time period) is greater than a predetermined threshold, the SPS signals may be determined to be unreliable. The number of UEs, for example, may be a percentage of UEs sending location information messages, e.g., if the percentage of UEs that are deriving location estimates based on non-SPS signals (within a predetermined time period) is greater than a predetermined threshold, the SPS signals may be determined to be unreliable.

In some implementations, the RSU 1002 may determine from the confidence level for the location estimate whether the SPS signals in the area are reliable or not reliable. For example, if a number of location estimates in the location information messages 1030 are derived from SPS signals, but the confidence levels for the location estimates are low, the SPS signals in the area of the RSU 1002 may be determined to be unreliable. A threshold number of low confidence levels may be used, wherein if a number of location estimates having a low confidence level is greater than the threshold, the SPS signals may be identified as unreliable. Different thresholds or weighting may be used for different levels of confidence. The RSU 1002 may determine reliability of the SPS signals in the area based on both the source of information and the confidence level. For example, if a number of location estimates are derived from non-SPS signals and if a number of the remaining location estimates derived from SPS signals are assigned low confidence levels, the RSU 1002 may determine that the SPS signals in the area are unreliable.

In some implementations, the RSU 1002 may determine from indications in the location information messages 1030 that received SPS signals were determined by the UE to be anomalous whether the SPS signals in the area are reliable or not reliable. For example, if a number of vehicles are sending location information messages warning that received SPS signals were determined to be anomalous, the RSU 1002 may determine that the SPS signals in the area around the RSU 1002 are unreliable. In some implementations, the receipt of a single indication warning that received SPS signals were determined to be anomalous may be sufficient to determine the SPS signals in the area are unreliable, and in other implementations, a greater number or a threshold percentage of UEs may be required.

At stage 1050, the RSU 1002 may be configured to send wireless messages, e.g., via transceiver 240 shown in FIG. 2, to one or more UEs 1006 (e.g., UEs in wireless range) with an indication that the SPS signal signals in the area are not reliable when the SPS signals have been determined to be unreliable in stage 1040. For example, the message provided to UEs 1006 may be transmitted via Wave Service Advertisement (WSA) or other channel, and may provide implicitly or explicitly a suggestion to use non-SPS signals for deriving location estimates.

At stage 1055, the RSU 1002 may be configured to send a message, e.g., via transceiver 240 or transceiver 250 shown in FIG. 2, to the traffic server 1004 with an indication that the SPS signal signals are not reliable when the SPS signals in the area within wireless range of the RSU 1002 have been determined to be unreliable.

Referring to FIG. 9, in another implementation, an RSU 910 may be used to identify unreliable or anomalous SPS signals based on the location information messages provided by one or more UEs. For example, in some implementations, where the UEs 902 and 904 do not determine whether the SPS signals are anomalous, but provide the RSU 910 with an SPS based location estimate, a few or all of the UEs within the range of the RSU 910 may receive anomalous SPS signals may be unaware that the SPS signals are anomalous. Thus, the UEs may send incorrect location estimates based on the anomalous SPS signals. Accordingly, the RSU 910 may determine whether the SPS signals in the area of the RSU are unreliable, e.g., based at least on the location estimates. For example, the RSU 910 may compare distances between location estimates for UE pairs to ranges between UE pair, e.g., provided by the UEs in the location information messages 920 and 921. Discrepancies between estimated locations and ranges of the UEs may be used to identify unreliable SPS signals in the area. The RSU 910 may report the presence of unreliable SPS signal to a competent authority, e.g., as illustrated traffic server 930 and/or to UEs 902 and 904.

Figure 11:
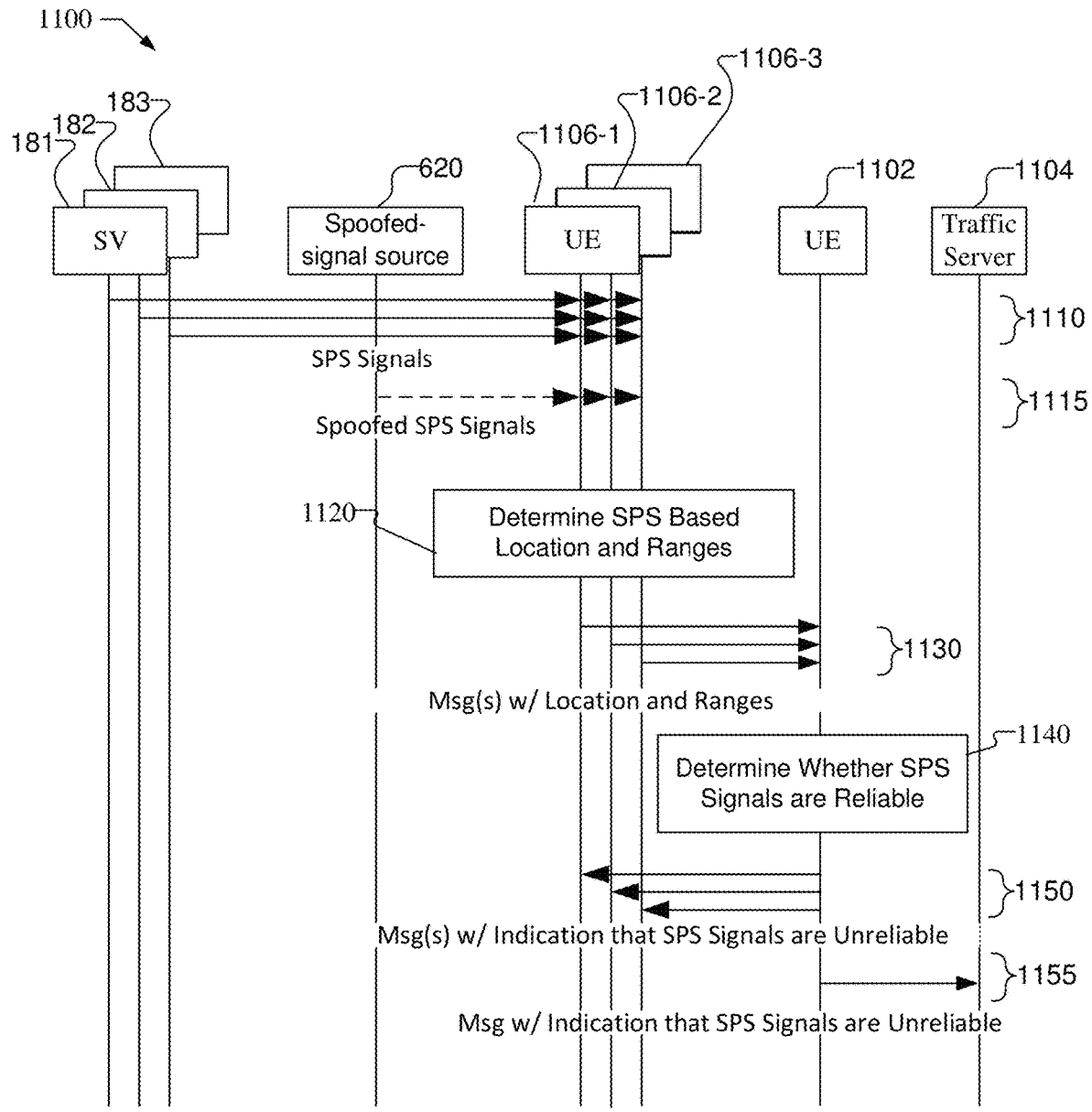
FIG. 11 illustrates a signaling and process flow showing identification of unreliable or anomalous SPS based, at least in part, on SPS derived location information from other UEs.

FIG. 11 illustrates a signaling and process flow 1100 showing identification of unreliable or anomalous SPS signals by a UE 1102 when based on the location information messages received from UEs 1106-1, 1106-2, 1106-3 (sometimes collectively referred to as UEs 1106). The UE 1102 may be an RSU, and may be referred to herein as RSU 1102, but may be another V-UE, sidelink UE, pedestrian held UE, or a smart device. The UEs 1106, for example, may be the same as UE 200, but may not individually determine whether received SPS signals are anomalous. The flow 1100 includes the stages shown but is an example only, as stages may be added, rearranged, and/or removed. Also, a limited quantity of UEs 1106 and SPS signals are shown in order to facilitate understanding, but numerous other signals and UEs may be included.

At stage 1110, non-anomalous SPS signals are sent by the SVs 181, 182, 183 and received by the UE 1106.

At stage 1115, the UE 1106 may receive anomalous SPS signals from the satellite signal emulator 620. The anomalous SPS signal may, for example, have a format that corresponds to the SV 183 but may be in inaccurate in some way (e.g., timing, power, etc.). The timing and number of the SPS signals shown are examples, and additional or different SPS signals may be received at times in addition or instead of the times shown. For example, the non-anomalous SPS signal may be sent by the SVs and received by the UE 1106 after the anomalous SPS signal is sent by the satellite signal emulator 620 and received by the UE 1106. The anomalous SPS signals may have the same or different carrier frequency as some or all of the non-anomalous SPS signals.

At stage 1120, the UEs 1106 may determine location estimates based on received SPS signals, including the spoofed SPS signals from stage 1115. The UEs 1106 may additionally determine ranges to other nearby UEs using RADAR sensors, LIDAR sensors, and/or well-known wireless ranging techniques (WAN, and/or Wi-Fi technologies), such as round trip time measurements.

At stage 1130, the RSU 1102 may be configured to receive wireless messages, e.g., via transceiver 240 shown in FIG. 2, from UEs 1106 that include the SPS based location estimate and may include the ranges to other UEs. Because the UEs 1106 do not determine whether the received SPS signals are anomalous in the present implementation, the messages in stage 1130 may not include the source of the information or confidence level associated with the location estimate. The wireless message may be V2X or other types of messages, e.g., used for ADAS, such as CAM, DENM, or BSM.

At stage 1140, the processor 210 in an RSU 1102 may be configured to determine whether the SPS signals are reliable, based on one or more messages received from the UEs 1106.

The RSU 1102, for example, may determine whether SPS signals are reliable or unreliable in the area around RSU 1102 (e.g., an area within wireless range to the RSU 1102 by UEs 1106), e.g. based at least on the location estimates received in the messages in stage 1130. As discussed herein, for example, the RSU 1102 may check the consistency of the location estimates for each UE over time. If the location estimates for a UE, for example, change in a manner that is inconsistent with expected movement of the UEs (e.g., vehicles moving sidewise or backwards one a freeway), the RSU 1102 may determine that the SPS signals are unreliable. Additionally or alternatively, the RSU 1102 may check the consistency of the estimated positions with respect to the ranges provided in the messages 1130. For example, the RSU 1102 may determine the distances between UE pairs based on their location estimates provided in messages 1130 and may compare the distances to the ranges between the UEs provided in the messages 1130. The RSU 1102 may determine whether the SPS signals are reliable based on the comparison of the distances to the ranges for one or more pair of UEs.

At stage 1150, the RSU 1102 may be configured to send wireless messages, e.g., via transceiver 240 shown in FIG. 2, to one or more UEs 1106 (e.g., UEs in wireless range) with an indication that the SPS signal signals in the area are not reliable when the SPS signals have been determined to be unreliable in stage 1140. For example, the message provided to UEs 1106 may be transmitted via Wave Service Advertisement (WSA) or other channel, and may provide implicitly or explicitly notify vehicles to check the location information fidelity or recommend to change the source of the location information used to determining a location estimate.

At stage 1155, the RSU 1102 may be configured to send a message, e.g., via transceiver 240 or transceiver 250 shown in FIG. 2, to the traffic server 1104 with an indication that the SPS signal signals are not reliable when the SPS signals in the area within wireless range of the RSU 1102 have been determined to be unreliable.

Accordingly, the detection of anomalous SPS signals may be offloaded to the RSU, which may have access to a more diverse source of information, e.g. from various UEs, than any one UE. Moreover, latency may be reduced by using an RSU for identification of anomalous SPS signals, compared to the use of a remote traffic server, and the RSU may provide the useful information to the traffic server.

Figure 12:
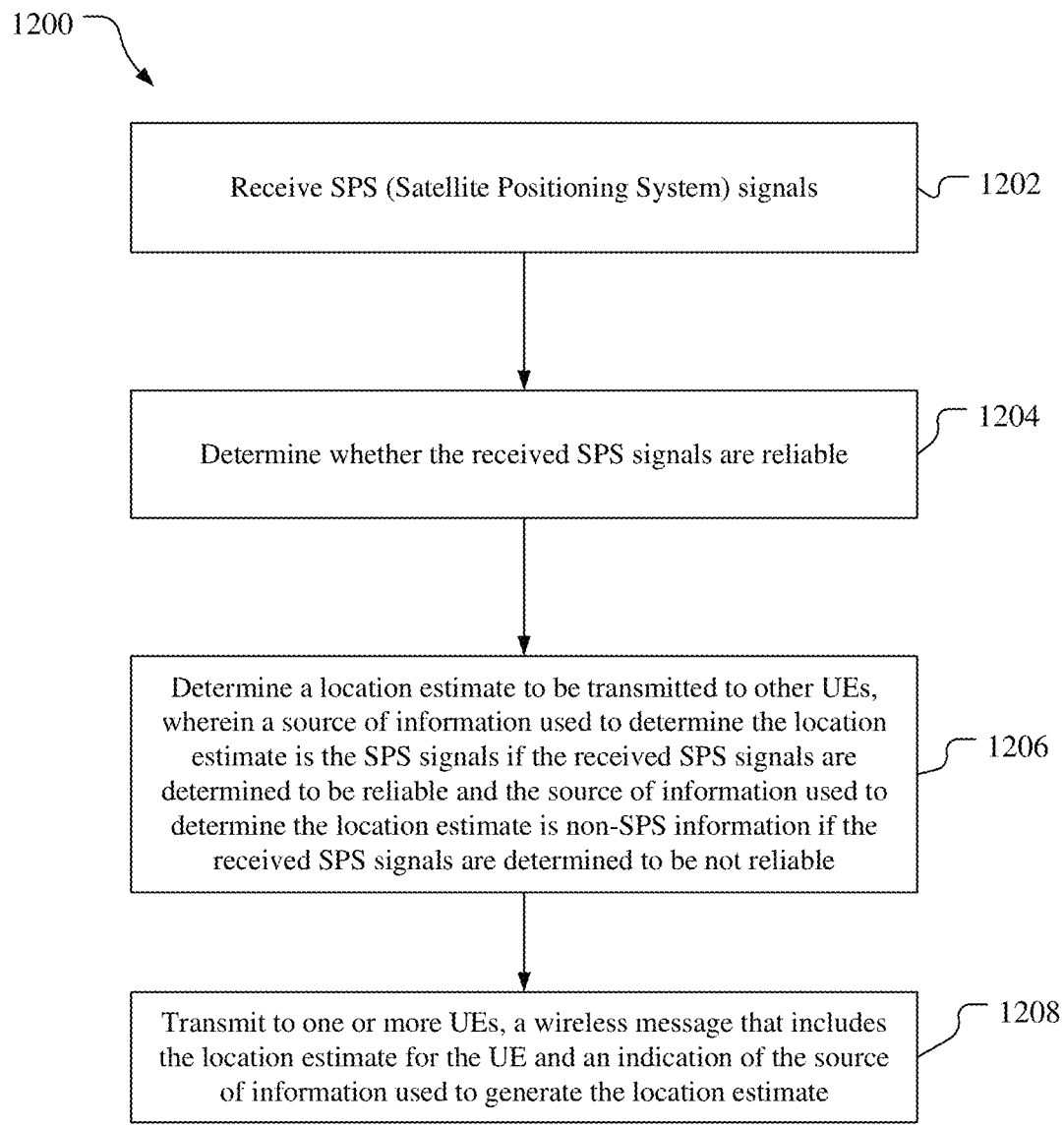
FIG. 12 is a flow diagram of a method of transmitting location information by a UE.

FIG. 12 is a flow chart 1200 illustrating a method of transmitting location information by a user equipment (UE), such as UE 200.

At block 1202, the UE receives SPS signals (Satellite Positioning System signals), e.g., as discussed in FIG. 5, stages 710 and 730 of FIG. 7 and stages 810 and 815 of FIG. 8. The SPS signals may be non-anomalous signals or may be anomalous signals, such as produced by a spoofed signal source. A means for receiving SPS signals (Satellite Positioning System signals) may be, e.g., the SPS receiver 217 and the one or more processors 210 with dedicated hardware or implementing executable code or software instructions in memory 211, such as the location determination module 282 in UE 200.

At block 1204, the UE determines whether the received SPS signals are reliable, e.g., as discussed at blocks 510 and 512 in FIG. 5, FIG. 7, and stage 850 of FIG. 8. A means for determining whether the received SPS signals are reliable may be, e.g., the one or more processors 210 with dedicated hardware or implementing executable code or software instructions in memory 211, such as the anomaly detection module 284 in UE 200.

At block 1206, the UE determines a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable, e.g., as discussed at blocks 512 and 514 in FIG. 5, FIG. 7, and stage 860 of FIG. 8. The non-SPS information, for example, may be at least one of a cached location for the UE, sensor information, including information from radar, sonar, lidar, accelerometers, gyroscopes, magnetometers, etc., received location information for other UEs, received cellular signals, received LAN signals, such WiFi, signals, or other short range signals such as UWB, mmWave, etc., or a combination thereof A means for determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable may be, e.g., the one or more processors 210 with dedicated hardware or implementing executable code or software instructions in memory 211, such as the location determination module 282, the anomaly detection module 284, and the location information report module 286 in UE 200.

At block 1208, the UE transmits to one or more UEs, a wireless message that includes the location estimate for the UE and an indication of the source of information used to generate the location estimate, e.g., as discussed at blocks 512, 514, and 516 of FIG. 5, and stages 860 and 870 of FIG. 8, and in FIG. 9. In one implementation, the UE is one of a vehicle based UE, a roadside unit, pedestrian held UE, or a smart device, e.g., as discussed in FIG. 1 and in FIGS. 8 and 9. In one implementation, the wireless message may be one of a vehicle-to-everything (V2X) message, a peer-to-peer message, or infrastructure-based message. For example, the wireless message may be one of a Common Awareness Message (CAM), a Decentralized Notification Message (DENM), or a Basic Safety Message (BSM). In one implementation, for example, the indication of the source of information may be provided in an information element in a location information message transmitted to the one or more UEs. In one example, the indication of the source of information may be a variable indicating whether the source of information is the SPS signals or the non-SPS information, e.g., as illustrated in Table 3. In another example, the indication of the source of information identifies a type of the source of information, e.g., as illustrated in Table 2. The indication of the source of information, for example, may be a variable that identifies the type of the source of information, as illustrated in Table 2. The type of the source of information may be identified from an enumerated list of types of the source of information. For example, the enumerated list of types of the source of information may include, e.g., one or more of SPS signals, cellular signals, local area network (LAN) signals, sidelink signals, time difference of arrival (TDOA) positioning, angle of arrival (AoA) positioning, and received signal strength (RSS) positioning, or any combinations thereof. A means for transmitting to one or more UEs, a message that includes the location estimate for the UE and an indication of the source of information used to generate the location estimate may be, e.g., the transceiver 240 shown in FIG. 2, and the one or more processors 210 with dedicated hardware or implementing executable code or software instructions in memory 211, such as the location information report module 286 in UE 200.

In one implementation, the UE may provide an indication whether the SPS signals are reliable in the message transmitted to the one or more UEs, e.g., as illustrated in stage 870 of FIG. 8 and in FIG. 9. A means for providing an indication whether the SPS signals are reliable in the message transmitted to the one or more UEs may be, e.g., the transceiver 240 shown in FIG. 2, and the one or more processors 210 with dedicated hardware or implementing executable code or software instructions in memory 211, such as the location information report module 286 in UE 200.

In one implementation, the UE may further determine a first location estimate based on the SPS signals, e.g., as discussed at stage 502 in FIG. 5 and stage 850 of FIG. 8, and may determine a second location estimate based on the non-SPS information, e.g., as discussed at stage 516 in FIG. 5 and stage 840 of FIG. 8. The UE may compare the first location estimate to the second location estimate, e.g., as discussed at stages 510 and 512 in FIG. 5 and stage 850 and 860 of FIG. 8. For example, whether the received SPS signals are reliable may be determined based on the comparison of the first location estimate to the second location estimate, e.g., as discussed at stages 510 and 512 in FIG. 5 and stage 850 and 860 of FIG. 8. A means for determining a first location estimate based on the SPS signals may be, e.g., the one or more processors 210 with dedicated hardware or implementing executable code or software instructions in memory 211, such as the location determination module 282 in UE 200. A means for determining a second location estimate based on the non-SPS information may be, e.g., the one or more processors 210 with dedicated hardware or implementing executable code or software instructions in memory 211, such as the location determination module 282 in UE 200. A means for comparing the first location estimate to the second location estimate may be, e.g., the one or more processors 210 with dedicated hardware or implementing executable code or software instructions in memory 211, such as the anomaly detection module 284 in UE 200.

For example, in one implementation, the UE may determine the location estimate to be transmitted to the other UEs by selecting the first location estimate to be transmitted to the other UEs if the received SPS signals are determined to be reliable and selecting the second location estimate to be transmitted to the other UEs if the received SPS signals are determined to be not reliable, e.g., as discussed at stages 510 and 512 in FIG. 5 and stage 850 and 860 of FIG. 8. A means for selecting the first location estimate to be transmitted to the other UEs if the received SPS signals are determined to be reliable and selecting the second location estimate to be transmitted to the other UEs if the received SPS signals are determined to be not reliable may be, e.g., the one or more processors 210 with dedicated hardware or implementing executable code or software instructions in memory 211, such as the anomaly detection module 284, and the location information report module 286 in UE 200.

Figure 13:
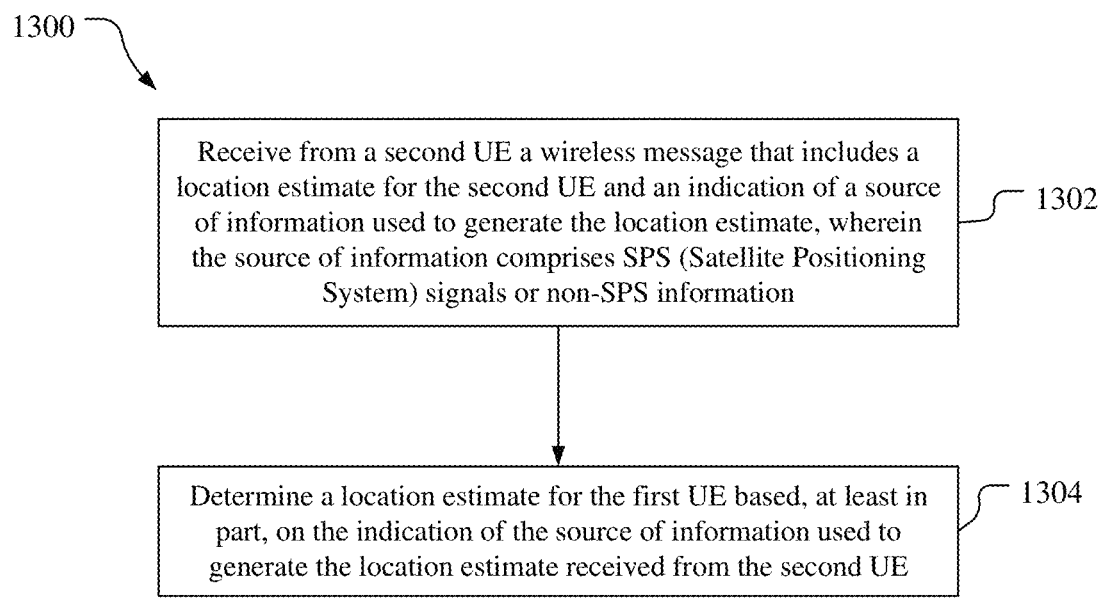
FIG. 13 is a flow diagram of a method of transmitting location information by a UE.

FIG. 13 is a flow chart 1300 illustrating a method of transmitting location information by a user equipment (UE), such as UE 200.

At block 1302, the UE receives from a second UE a wireless message that includes a location estimate for the second UE and an indication of a source of information used to generate the location estimate, wherein the source of information comprises SPS (Satellite Positioning System) signals or non-SPS information, e.g., as discussed in block 504 of FIG. 5, stage 830 and 870 of FIG. 8, and FIG. 9. In one implementation, the UE is one of a vehicle based UE, a roadside unit, pedestrian held UE, or a smart device, e.g., as discussed in FIG. 1 and in FIGS. 8 and 9. In one implementation, the wireless message may be one of a vehicle-to-everything (V2X) message, a peer-to-peer message, or infrastructure-based message. For example, the message may be one of a Common Awareness Message (CAM), a Decentralized Notification Message (DENM), or a Basic Safety Message (BSM). In one implementation, for example, the indication of the source of information may be provided in an information element in a location information message transmitted to the one or more UEs. In one example, the indication of the source of information may be a variable indicating whether the source of information is the SPS signals or the non-SPS information, e.g., as illustrated in Table 3. In another example, the indication of the source of information identifies a type of the source of information, e.g., as illustrated in Table 2. The indication of the source of information, for example, may be a variable that identifies the type of the source of information, as illustrated in Table 2. The type of the source of information may be identified from an enumerated list of types of the source of information. For example, the enumerated list of types of the source of information may include, e.g., one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

A means for receiving from a second UE a message that includes a location estimate for the second UE and an indication of a source of information used to generate the location estimate, wherein the source of information comprises SPS (Satellite Positioning System) signals or non-SPS information may be, e.g., the transceiver 240 shown in FIG. 2, and the one or more processors 210 with dedicated hardware or implementing executable code or software instructions in memory 211, such as the location information report module 286 in UE 200.

At block 1304, the UE determines a location estimate for the first UE based, at least in part, on the indication of the source of information used to generate the location estimate received from the second UE, e.g., as discussed in blocks 502, 516, 510, and 514 of FIG. 5, stage 840, 850, and 860 of FIG. 8, and FIG. 9. A means for determining a location estimate for the first UE based, at least in part, on the indication of the source of information used to generate the location estimate received from the second UE may be, e.g., the transceiver 240 shown in FIG. 2, and the one or more processors 210 with dedicated hardware or implementing executable code or software instructions in memory 211, such as the location determination module 282 in UE 200.

In one implementation, the UE may determine a location estimate for the first UE based, at least in part, on the indication of the source of information by receiving SPS signals, e.g., as discussed in FIG. 5, stages 710 and 730 of FIG. 7 and stages 810 and 815 of FIG. 8, determine whether the received SPS signals are reliable based at least in part on the indication of the source of information used to generate the location estimate received from the second UE, e.g., as discussed at blocks 510 and 512 in FIG. 5, FIG. 7, and stage 850 of FIG. 8, and determine the location estimate for the first UE using the received SPS signals if the received SPS signals are determined to be reliable and using non-SPS information if the received SPS signals are determined to be not reliable, e.g., as discussed at blocks 512 and 514 in FIG. 5, FIG. 7, and stage 860 of FIG. 8. For example, the non-SPS information may comprise at least one of a cached location for the UE, sensor information, including information from radar, sonar, lidar, accelerometers, gyroscopes, magnetometers, etc., received location information for other UEs, received cellular signals, received LAN signals, such WiFi, signals, or other short range signals such as UWB, mmWave, etc., or a combination thereof. A means for receiving SPS signals may be, e.g., the SPS receiver 217 and the one or more processors 210 with dedicated hardware or implementing executable code or software instructions in memory 211, such as the location determination module 282 in UE 200. A means for determining whether the received SPS signals are reliable based at least in part on the indication of the source of information used to generate the location estimate received from the second UE may be, e.g., the one or more processors 210 with dedicated hardware or implementing executable code or software instructions in memory 211, such as the anomaly detection module 284 in UE 200. A means for determining the location estimate for the first UE using the received SPS signals if the received SPS signals are determined to be reliable and using non-SPS information if the received SPS signals are determined to be not reliable may be, e.g., the one or more processors 210 with dedicated hardware or implementing executable code or software instructions in memory 211, such as the location determination module 282, the anomaly detection module 284, and the location information report module 286 in UE 200.

In one implementation, the UE may receive an indication whether SPS signals received by the second UE are reliable in the message received from the second UE, wherein determining the location estimate for the first UE is further based, at least in part, on the indication whether the SPS signals received by the second UE are reliable, e.g., as illustrated in stage 870 of FIG. 8 and in FIG. 9. A means for receiving an indication whether SPS signals received by the second UE are reliable in the message received from the second UE, wherein determining the location estimate for the first UE is further based, at least in part, on the indication whether the SPS signals received by the second UE are reliable may be, e.g., the transceiver 240 shown in FIG. 2, and the one or more processors 210 with dedicated hardware or implementing executable code or software instructions in memory 211, such as the location information report module 286 in UE 200.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

Clause 1. A method performed by a user equipment (UE) for transmitting location information, the method comprising:
  receiving SPS (Satellite Positioning System) signals;
  determining whether the received SPS signals are reliable;
  determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and
  transmitting to one or more UEs, a wireless message that includes the location estimate for the UE and an indication of the source of information used to generate the location estimate.

Clause 2. The method of clause 1, wherein the indication of the source of information is provided in an information element in a location information message transmitted to the one or more UEs.

Clause 3. The method of either of clauses 1 or 2, wherein the indication of the source of information comprises a variable indicating whether the source of information is the SPS signals or the non-SPS information.

Clause 4. The method of any of clauses 1-3, wherein the indication of the source of information identifies a type of the source of information.

Clause 5. The method of clause 4, wherein the indication of the source of information comprises a variable that identifies the type of the source of information.

Clause 6. The method of clause 4, wherein the type of the source of information is identified from an enumerated list of types of the source of information.

Clause 7. The method of clause 6, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 8. The method of any of clauses 1-7, further comprising providing an indication whether the SPS signals are reliable in the wireless message transmitted to the one or more UEs.

Clause 9. The method of any of clauses 1-8, further comprising:
  determining a first location estimate based on the SPS signals;
  determining a second location estimate based on the non-SPS information; and
  comparing the first location estimate to the second location estimate;
  wherein whether the received SPS signals are reliable is determined based on the comparison of the first location estimate to the second location estimate.

Clause 10. The method of clause 9, wherein the determining the location estimate to be transmitted to the other UEs comprises selecting the first location estimate to be transmitted to the other UEs if the received SPS signals are determined to be reliable and selecting the second location estimate to be transmitted to the other UEs if the received SPS signals are determined to be not reliable.

Clause 11. The method of any of clauses 1-10, wherein the non-SPS information comprises at least one of a cached location for the UE, sensor information, received location information for other UEs, received cellular signals, received local area network (LAN) signals, or a combination thereof.

Clause 12. The method of any of clauses 1-11, wherein the UE is one of a vehicle based UE, a roadside unit, pedestrian held UE, or a smart device.

Clause 13. The method of any of clauses 1-12, wherein the wireless message is one of a vehicle-to-everything (V2X) message, a peer-to-peer message, or infrastructure-based message.

Clause 14. The method of any of clauses 1-13, wherein the wireless message is one of a Common Awareness Message (CAM), a Decentralized Notification Message (DENM), or a Basic Safety Message (BSM).

Clause 15. A user equipment (UE) configured for transmitting location information, the UE comprising:
at least one wireless transceiver configured to wirelessly communicate with entities in a wireless network;
an SPS (Satellite Positioning System) receiver configured to receive SPS signals;
at least one memory; and
at least one processor coupled to the at least one wireless transceiver, the SPS receiver, and the at least one memory, wherein the at least one processor is configured to:
receive, via the SPS receiver, SPS signals;
determine whether the received SPS signals are reliable;
determine a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and
transmit, via the at least one wireless transceiver, to one or more UEs, a wireless message that includes the location estimate for the UE and an indication of the source of information used to generate the location estimate.

Clause 16. The UE of clause 15, wherein the indication of the source of information is provided in an information element in a location information message transmitted to the one or more UEs.

Clause 17. The UE of either of clauses 15 or 16, wherein the indication of the source of information comprises a variable indicating whether the source of information is the SPS signals or the non-SPS information.

Clause 18. The UE of any of clauses 15-17, wherein the indication of the source of information identifies a type of the source of information.

Clause 19. The UE of clause 18, wherein the indication of the source of information comprises a variable that identifies the type of the source of information.

Clause 20. The UE of clause 18, wherein the type of the source of information is identified from an enumerated list of types of the source of information.

Clause 21. The UE of clause 20, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 22. The UE of any of clauses 15-21, wherein the at least one processor is further configured to provide an indication whether the SPS signals are reliable in the wireless message transmitted to the one or more UEs.

Clause 23. The UE of any of clauses 15-22, wherein the at least one processor is further configured to:
determine a first location estimate based on the SPS signals;
determine a second location estimate based on the non-SPS information; and
compare the first location estimate to the second location estimate;
wherein whether the received SPS signals are reliable is determined based on the comparison of the first location estimate to the second location estimate.

Clause 24. The UE of clause 23, wherein the at least one processor is configured to determine the location estimate to be transmitted to the other UEs by being configured to select the first location estimate to be transmitted to the other UEs if the received SPS signals are determined to be reliable and to select the second location estimate to be transmitted to the other UEs if the received SPS signals are determined to be not reliable.

Clause 25. The UE of any of clauses 15-24, wherein the non-SPS information comprises at least one of a cached location for the UE, sensor information, received location information for other UEs, received cellular signals, received local area network (LAN) signals, or a combination thereof.

Clause 26. The UE of any of clauses 15-25, wherein the UE is one of a vehicle based UE, a roadside unit, pedestrian held UE, or a smart device.

Clause 27. The UE of any of clauses 15-26, wherein the wireless message is one of a vehicle-to-everything (V2X) message, a peer-to-peer message, or infrastructure-based message.

Clause 28. The UE of any of clauses 15-27, wherein the wireless message is one of a Common Awareness Message (CAM), a Decentralized Notification Message (DENM), or a Basic Safety Message (BSM).

Clause 29. A user equipment (UE) configured for transmitting location information, the UE comprising:
means for receiving SPS (Satellite Positioning System) signals;
means for determining whether the received SPS signals are reliable;
means for determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and
means for transmitting to one or more UEs, a wireless message that includes the location estimate for the UE and an indication of the source of information used to generate the location estimate.

Clause 30. The UE of clause 29, wherein the indication of the source of information is provided in an information element in a location information wireless message transmitted to the one or more UEs.

Clause 31. The UE of either of clauses 29 or 30, wherein the indication of the source of information comprises a variable indicating whether the source of information is the SPS signals or the non-SPS information.

Clause 32. The UE of any of clauses 29-31, wherein the indication of the source of information identifies a type of the source of information.

Clause 33. The UE of clause 32, wherein the indication of the source of information comprises a variable that identifies the type of the source of information.

Clause 34. The UE of clause 32, wherein the type of the source of information is identified from an enumerated list of types of the source of information.

Clause 35. The UE of clause 34, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 36. The UE of any of clauses 29-35, further comprising means for providing an indication whether the SPS signals are reliable in the wireless message transmitted to the one or more UEs.

Clause 37. The UE of any of clauses 29-35, further comprising:
 means for determining a first location estimate based on the SPS signals;
 means for determining a second location estimate based on the non-SPS information; and
 means for comparing the first location estimate to the second location estimate;
 wherein whether the received SPS signals are reliable is determined based on the comparison of the first location estimate to the second location estimate.

Clause 38. The UE of clause 37, wherein the means for determining the location estimate to be transmitted to the other UEs comprises means for selecting the first location estimate to be transmitted to the other UEs if the received SPS signals are determined to be reliable and means for selecting the second location estimate to be transmitted to the other UEs if the received SPS signals are determined to be not reliable.

Clause 39. The UE of any of clauses 29-38, wherein the non-SPS information comprises at least one of a cached location for the UE, sensor information, received location information for other UEs, received cellular signals, received local area network (LAN) signals, or a combination thereof.

Clause 40. The UE of any of clauses 29-39, wherein the UE is one of a vehicle based UE, a roadside unit, pedestrian held UE, or a smart device.

Clause 41. The UE of any of clauses 29-40, wherein the wireless message is one of a vehicle-to-everything (V2X) message, a peer-to-peer message, or infrastructure-based message.

Clause 42. The UE of any of clauses 29-41, wherein the wireless message is one of a Common Awareness Message (CAM), a Decentralized Notification Message (DENM), or a Basic Safety Message (BSM).

Clause 43. A non-transitory storage medium including program code stored thereon, the program code is operable to configure at least one processor in a user equipment (UE) for transmitting location information, the program code including instructions to:
 receive SPS (Satellite Positioning System) signals;
 determine whether the received SPS signals are reliable;
 determine a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and
 transmit to one or more UEs, a wireless message that includes the location estimate for the UE and an indication of the source of information used to generate the location estimate.

Clause 44. The non-transitory storage medium of clause 43, wherein the indication of the source of information is provided in an information element in a location information message transmitted to the one or more UEs.

Clause 45. The non-transitory storage medium of either of clauses 43 or 44, wherein the indication of the source of information comprises a variable indicating whether the source of information is the SPS signals or the non-SPS information.

Clause 46. The non-transitory storage medium of any of clauses 43-45, wherein the indication of the source of information identifies a type of the source of information.

Clause 47. The non-transitory storage medium of clause 46, wherein the indication of the source of information comprises a variable that identifies the type of the source of information.

Clause 48. The non-transitory storage medium of clause 46, wherein the type of the source of information is identified from an enumerated list of types of the source of information.

Clause 49. The non-transitory storage medium of clause 48, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 50. The non-transitory storage medium of any of clauses 43-49, the program code further including instructions to provide an indication whether the SPS signals are reliable in the wireless message transmitted to the one or more UEs.

Clause 51. The non-transitory storage medium of any of clauses 43-50, the program code further including instructions to:
 determine a first location estimate based on the SPS signals;
 determine a second location estimate based on the non-SPS information; and
 compare the first location estimate to the second location estimate;
 wherein whether the received SPS signals are reliable is determined based on the comparison of the first location estimate to the second location estimate.

Clause 52. The non-transitory storage medium of clause 51, wherein the instructions to determine the location estimate to be transmitted to the other UEs comprises the instructions to select the first location estimate to be transmitted to the other UEs if the received SPS signals are determined to be reliable and select the second location estimate to be transmitted to the other UEs if the received SPS signals are determined to be not reliable.

Clause 53. The non-transitory storage medium of any of clauses 43-52, wherein the non-SPS information comprises at least one of a cached location for the UE, sensor information, received location information for other UEs, received cellular signals, received local area network (LAN) signals, or a combination thereof.

Clause 54. The non-transitory storage medium of any of clauses 43-53, wherein the UE is one of a vehicle based UE, a roadside unit, pedestrian held UE, or a smart device.

Clause 55. The non-transitory storage medium of any of clauses 43-54, wherein the wireless message is one of a vehicle-to-everything (V2X) message, a peer-to-peer message, or infrastructure-based message.

Clause 56. The non-transitory storage medium of any of clauses 43-55, wherein the wireless message is one of a Common Awareness Message (CAM), a Decentralized Notification Message (DENM), or a Basic Safety Message (BSM).

Clause 57. A method performed by a first user equipment (UE) for transmission of location information, the method comprising:
receiving from a second UE a wireless message that includes a location estimate for the second UE and an indication of a source of information used to generate the location estimate, wherein the source of information comprises SPS (Satellite Positioning System) signals or non-SPS information; and
determining a location estimate for the first UE based, at least in part, on the indication of the source of information used to generate the location estimate received from the second UE.

Clause 58. The method of clause 57, wherein determining a location estimate for the first UE based, at least in part, on the indication of the source of information comprises:
receiving SPS signals;
determining whether the received SPS signals are reliable based, at least in part, on the indication of the source of information used to generate the location estimate received from the second UE; and
determining the location estimate for the first UE using the received SPS signals if the received SPS signals are determined to be reliable and using non-SPS information if the received SPS signals are determined to be not reliable.

Clause 59. The method of clause 58, wherein the non-SPS information comprises at least one of a cached location for the UE, sensor information, received location information for other UEs, received cellular signals, received local area network (LAN) signals, or a combination thereof.

Clause 60. The method of any of clauses 57-59, wherein the indication of the source of information is provided in an information element in a location information message received from the second UE.

Clause 61. The method of any of clauses 57-60, wherein the indication of the source of information comprises a variable indicating whether the source of information is the SPS signals or the non-SPS information.

Clause 62. The method of any of clauses 57-61, wherein the indication of the source of information identifies a type of the source of information.

Clause 63. The method of clause 62, wherein the indication of the source of information comprises a variable that identifies the type of the source of information.

Clause 64. The method of clause 62, wherein the type of the source of information is identified from an enumerated list of types of the source of information.

Clause 65. The method of clause 64, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 66. The method of any of clauses 57-65, further comprising receiving an indication whether SPS signals received by the second UE are reliable in the wireless message received from the second UE, wherein determining the location estimate for the first UE is further based, at least in part, on the indication whether the SPS signals received by the second UE are reliable.

Clause 67. The method of any of clauses 57-66, wherein the first UE is one of a vehicle based UE, a roadside unit, pedestrian held UE, or a smart device.

Clause 68. The method of any of clauses 57-67, wherein the wireless message is one of a vehicle-to-everything (V2X) message, a peer-to-peer message, or infrastructure-based message.

Clause 69. The method of any of clauses 57-68, wherein the wireless message is one of a Common Awareness Message (CAM), a Decentralized Notification Message (DENM), or a Basic Safety Message (BSM).

Clause 70. A first user equipment (UE) configured for transmitting location information, the first UE comprising:
at least one wireless transceiver configured to wirelessly communicate with entities in a wireless network;
an SPS (Satellite Positioning System) receiver configured to receive SPS signals;
at least one memory; and
at least one processor coupled to the at least one wireless transceiver, the SPS receiver, and the at least one memory, wherein the at least one processor is configured to:
receive, via the at least one wireless transceiver, from a second UE a wireless message that includes a location estimate for the second UE and an indication of a source of information used to generate the location estimate, wherein the source of information comprises SPS signals or non-SPS information; and
determine a location estimate for the first UE based, at least in part, on the indication of the source of information used to generate the location estimate received from the second UE.

Clause 71. The first UE of clause 70, wherein the at least one processor is configured to determine a location estimate for the first UE based, at least in part, on the indication of the source of information by being configured to:
receive SPS signals via the SPS receiver;
determine whether the received SPS signals are reliable based, at least in part, on the indication of the source of information used to generate the location estimate received from the second UE; and
determine the location estimate for the first UE using the received SPS signals if the received SPS signals are determined to be reliable and using non-SPS information if the received SPS signals are determined to be not reliable.

Clause 72. The first UE of clause 71, wherein the non-SPS information comprises at least one of a cached location for the UE, sensor information, received location information for other UEs, received cellular signals, received local area network (LAN) signals, or a combination thereof.

Clause 73. The first UE of any of clauses 70-72, wherein the indication of the source of information is provided in an information element in a location information message received from the second UE.

Clause 74. The first UE of any of clauses 70-73, wherein the indication of the source of information comprises a variable indicating whether the source of information is the SPS signals or the non-SPS information.

Clause 75. The first UE of any of clauses 70-74, wherein the indication of the source of information identifies a type of the source of information.

Clause 76. The first UE of clause 75, wherein the indication of the source of information comprises a variable that identifies the type of the source of information.

Clause 77. The first UE of clause 75, wherein the type of the source of information is identified from an enumerated list of types of the source of information.

Clause 78. The first UE of clause 77, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 79. The first UE of any of clauses 70-78, wherein the at least one processor is further configured to receive an indication whether SPS signals received by the second UE are reliable in the wireless message received from the second UE, wherein the location estimate for the first UE is determined further based, at least in part, on the indication whether the SPS signals received by the second UE are reliable.

Clause 80. The first UE of any of clauses 70-79, wherein the first UE is one of a vehicle based UE, a roadside unit, pedestrian held UE, or a smart device.

Clause 81. The first UE of any of clauses 70-80, wherein the wireless message is one of a vehicle-to-everything (V2X) message, a peer-to-peer message, or infrastructure-based message.

Clause 82. The first UE of any of clauses 70-81, wherein the wireless message is one of a Common Awareness Message (CAM), a Decentralized Notification Message (DENM), or a Basic Safety Message (BSM).

Clause 83. A first user equipment (UE) configured for transmitting location information, the first UE comprising:
  means for receiving from a second UE a wireless message that includes a location estimate for the second UE and an indication of a source of information used to generate the location estimate, wherein the source of information comprises SPS (Satellite Positioning System) signals or non-SPS information; and
  means for determining a location estimate for the first UE based, at least in part, on the indication of the source of information used to generate the location estimate received from the second UE.

Clause 84. The first UE of clause 83, wherein the means for determining a location estimate for the first UE based, at least in part, on the indication of the source of information comprises:
  means for receiving SPS signals;
  means for determining whether the received SPS signals are reliable based, at least in part, on the indication of the source of information used to generate the location estimate received from the second UE; and
  means for determining the location estimate for the first UE using the received SPS signals if the received SPS signals are determined to be reliable and using non-SPS information if the received SPS signals are determined to be not reliable.

Clause 85. The first UE of clause 84, wherein the non-SPS information comprises at least one of a cached location for the UE, sensor information, received location information for other UEs, received cellular signals, received local area network (LAN) signals, or a combination thereof.

Clause 86. The first UE of any of clauses 83-85, wherein the indication of the source of information is provided in an information element in a location information message received from the second UE.

Clause 87. The first UE of any of clauses 83-86, wherein the indication of the source of information comprises a variable indicating whether the source of information is the SPS signals or the non-SPS information.

Clause 88. The first UE of any of clauses 83-87, wherein the indication of the source of information identifies a type of the source of information.

Clause 89. The first UE of clause 88, wherein the indication of the source of information comprises a variable that identifies the type of the source of information.

Clause 90. The first UE of clause 88, wherein the type of the source of information is identified from an enumerated list of types of the source of information.

Clause 91. The first UE of clause 90, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 92. The first UE of any of clauses 83-91, further comprising means for receiving an indication whether SPS signals received by the second UE are reliable in the wireless message received from the second UE, wherein the location estimate for the first UE is further determined based, at least in part, on the indication whether the SPS signals received by the second UE are reliable.

Clause 93. The first UE of any of clauses 83-92, wherein the first UE is one of a vehicle based UE, a roadside unit, pedestrian held UE, or a smart device.

Clause 94. The first UE of any of clauses 83-93, wherein the wireless message is one of a vehicle-to-everything (V2X) message, a peer-to-peer message, or infrastructure-based message.

Clause 95. The first UE of any of clauses 83-94, wherein the wireless message is one of a Common Awareness Message (CAM), a Decentralized Notification Message (DENM), or a Basic Safety Message (BSM).

Clause 96. A non-transitory storage medium including program code stored thereon, the program code is operable to configure at least one processor in a first user equipment (UE) configured for transmitting location information, the program code including instructions to:
  receive from a second UE a wireless message that includes a location estimate for the second UE and an indication of a source of information used to generate the location estimate, wherein the source of information comprises SPS (Satellite Positioning System) signals or non-SPS information; and
  determine a location estimate for the first UE based, at least in part, on the indication of the source of information used to generate the location estimate received from the second UE.

Clause 97. The non-transitory storage medium of clause 96, wherein the instructions to determine a location estimate for the first UE based, at least in part, on the indication of the source of information comprise instructions to:
  receive SPS signals;
  determine whether the received SPS signals are reliable based, at least in part, on the indication of the source of information used to generate the location estimate received from the second UE; and determine the location estimate for the first UE using the received SPS signals if the received SPS signals are determined to be reliable and using non-SPS information if the received SPS signals are determined to be not reliable.

Clause 98. The non-transitory storage medium of clause 97, wherein the non-SPS information comprises at least one of a cached location for the UE, sensor information, received location information for other UEs, received cellular signals, received local area network (LAN) signals, or a combination thereof.

Clause 99. The non-transitory storage medium of any of clauses 96-98, wherein the indication of the source of information is provided in an information element in a location information message received from the second UE.

Clause 100. The non-transitory storage medium of any of clauses 96-99, wherein the indication of the source of information comprises a variable indicating whether the source of information is the SPS signals or the non-SPS information.

Clause 101. The non-transitory storage medium of any of clauses 96-100, wherein the indication of the source of information identifies a type of the source of information.

Clause 102. The non-transitory storage medium of clause 101, wherein the indication of the source of information comprises a variable that identifies the type of the source of information.

Clause 103. The non-transitory storage medium of clause 101, wherein the type of the source of information is identified from an enumerated list of types of the source of information.

Clause 104. The non-transitory storage medium of clause 103, wherein the enumerated list of types of the source of information comprises one or more of SPS signals, cellular signals, local area network (LAN) signals, sidelink signals, time difference of arrival (TDOA) positioning, angle of arrival (AoA) positioning, and received signal strength (RSS) positioning, or any combinations thereof.

Clause 105. The non-transitory storage medium of any of clauses 96-104, the program code further including instructions to receive an indication whether SPS signals received by the second UE are reliable in the wireless message received from the second UE, wherein the location estimate for the first UE is determined further based, at least in part, on the indication whether the SPS signals received by the second UE are reliable.

Clause 106. The non-transitory storage medium of any of clauses 96-105, wherein the first UE is one of a vehicle based UE, a roadside unit, pedestrian held UE, or a smart device.

Clause 107. The non-transitory storage medium of any of clauses 96-106, wherein the wireless message is one of a vehicle-to-everything (V2X) message, a peer-to-peer message, or infrastructure-based message.

Clause 108. The non-transitory storage medium of any of clauses 96-107, wherein the wireless message is one of a Common Awareness Message (CAM), a Decentralized Notification Message (DENM), or a Basic Safety Message (BSM).

Therefore, it is intended that claimed subject matter not be limited to the particular examples disclosed, but that such claimed subject matter may also include all aspects falling within the scope of appended claims, and equivalents thereof.

What is claimed is:

1. A method performed by a user equipment (UE) for transmitting location information, the method comprising:
receiving SPS (Satellite Positioning System) signals;
determining whether the received SPS signals are reliable;
determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and
transmitting to one or more UEs, a wireless message that includes the location estimate for the UE and an indication of the source of information used to generate the location estimate, wherein the indication of the source of information comprises a variable indicating whether the source of information is the SPS signals or the non-SPS information, and wherein the non-SPS information indicating a wireless signal-based source of information comprising at least one of cellular signals, local area network (LAN) signals, sidelink signals, time difference of arrival (TDOA) positioning, angle of arrival (AoA) positioning, received signal strength (RSS) positioning, or any combinations thereof.

2. The method of claim 1, wherein the indication of the source of information is provided in an information element in a location information message transmitted to the one or more UEs.

3. The method of claim 1, further comprising providing an indication whether the
SPS signals are reliable in the wireless message transmitted to the one or more UEs.

4. The method of claim 1, further comprising:
determining a first location estimate based on the SPS signals;
determining a second location estimate based on the non-SPS information; and comparing the first location estimate to the second location estimate;
wherein whether the received SPS signals are reliable is determined based on the comparison of the first location estimate to the second location estimate.

5. The method of claim 4, wherein the determining the location estimate to be transmitted to the other UEs comprises selecting the first location estimate to be transmitted to the other UEs if the received SPS signals are determined to be reliable and selecting the second location estimate to be transmitted to the other UEs if the received SPS signals are determined to be not reliable.

6. The method of claim 1, wherein the non-SPS information comprises at least one of a cached location for the UE, received location information for other UEs, received cellular signals, received local area network (LAN) signals, or a combination thereof.

7. The method of claim 1, wherein the UE is one of a vehicle based UE, a roadside unit, pedestrian held UE, or a smart device.

8. The method of claim 1, wherein the wireless message is one of a vehicle-to-everything (V2X) message, a peer-to-peer message, infrastructure-based message a Common Awareness Message (CAM), a Decentralized Notification Message (DENM), or a Basic Safety Message (BSM).

9. A user equipment (UE) configured for transmitting location information, the UE comprising:
at least one wireless transceiver configured to wirelessly communicate with entities in a wireless network;
an SPS (Satellite Positioning System) receiver configured to receive SPS signals;
at least one memory; and at least one processor coupled to the at least one wireless transceiver, the SPS receiver, and the at least one memory, wherein the at least one processor is configured to:

receive, via the SPS receiver, SPS signals;

determine whether the received SPS signals are reliable;

determine a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and transmit, via the at least one wireless transceiver, to one or more UEs, a wireless message that includes the location estimate for the UE and an indication of the source of information used to generate the location estimate, wherein the indication of the source of information comprises a variable indicating whether the source of information is the SPS signals or the non-SPS information, and wherein the non-SPS information indicating a wireless signal-based source of information comprising at least one of cellular signals, local area network (LAN) signals, sidelink signals, time difference of arrival (TDOA) positioning, angle of arrival (AoA) positioning, received signal strength (RSS) positioning, or any combinations thereof.

10. The UE of claim 9, wherein the indication of the source of information is provided in an information element in a location information message transmitted to the one or more UEs.

11. The UE of claim 9, wherein the at least one processor is further configured to provide an indication whether the SPS signals are reliable in the wireless message transmitted to the one or more UEs.

12. The UE of claim 9, wherein the at least one processor is further configured to: determine a first location estimate based on the SPS signals;
determine a second location estimate based on the non-SPS information; and compare the first location estimate to the second location estimate;
wherein whether the received SPS signals are reliable is determined based on the comparison of the first location estimate to the second location estimate.

13. The UE of claim 12, wherein the at least one processor is configured to determine the location estimate to be transmitted to the other UEs by being configured to select the first location estimate to be transmitted to the other UEs if the received SPS signals are determined to be reliable and to select the second location estimate to be transmitted to the other UEs if the received SPS signals are determined to be not reliable.

14. The UE of claim 9, wherein the non-SPS information comprises at least one of a cached location for the UE, received location information for other UEs, received cellular signals, received local area network (LAN) signals, or a combination thereof.

15. The UE of claim 9, wherein the UE is one of a vehicle based UE, a roadside unit, pedestrian held UE, or a smart device.

16. The UE of claim 9, wherein the wireless message is one of a vehicle-to-everything (V2X) message, a peer-to-peer message, infrastructure-based message, a Common Awareness Message (CAM), a Decentralized Notification Message (DENM), or a Basic Safety Message (BSM).

17. A user equipment (UE) configured for transmitting location information, the UE comprising:
means for receiving SPS (Satellite Positioning System) signals; means for determining whether the received SPS signals are reliable;
means for determining a location estimate to be transmitted to other UEs, wherein a source of information used to determine the location estimate is the SPS signals if the received SPS signals are determined to be reliable and the source of information used to determine the location estimate is non-SPS information if the received SPS signals are determined to be not reliable; and
means for transmitting to one or more UEs, a wireless message that includes the location estimate for the UE and an indication of the source of information used to generate the location estimate, wherein the indication of the source of information comprises a variable indicating whether the source of information is the SPS signals or the non-SPS information, and wherein the non-SPS information indicating a wireless signal-based source of information comprising at least one of cellular signals, local area network (LAN) signals, sidelink signals, time difference of arrival (TDOA) positioning, angle of arrival (AoA) positioning, received signal strength (RSS) positioning, or any combinations thereof.

18. The UE of claim 17, wherein the indication of the source of information is provided in an information element in a location information wireless message transmitted to the one or more UEs.

19. The UE of claim 17, further comprising:
means for determining a first location estimate based on the SPS signals; means for determining a second location estimate based on the non-SPS information; and
means for comparing the first location estimate to the second location estimate; wherein whether the received SPS signals are reliable is determined based on the comparison of the first location estimate to the second location estimate.

* * * * *